United States Patent
Kodama et al.

(10) Patent No.: US 9,475,478 B2
(45) Date of Patent: Oct. 25, 2016

(54) DRIVE SYSTEM OF A HYBRID VEHICLE

(71) Applicant: TOYOTA JIDOSHA KABUSHIKI KAISHA, Toyota-shi, Aichi (JP)

(72) Inventors: Takuya Kodama, Aichi-gun (JP); Taku Harada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/744,744

(22) Filed: Jun. 19, 2015

(65) Prior Publication Data

US 2015/0367829 A1 Dec. 24, 2015

(30) Foreign Application Priority Data

Jun. 19, 2014 (JP) .................................. 2014-126739
Jun. 16, 2015 (JP) .................................. 2015-121577

(51) Int. Cl.
| | | |
|---|---|---|
| B60L 9/00 | (2006.01) | |
| F16H 3/72 | (2006.01) | |
| H02P 7/00 | (2016.01) | |

(Continued)

(52) U.S. Cl.
CPC .............. B60W 10/08 (2013.01); B60K 6/365 (2013.01); B60K 6/445 (2013.01); B60K 6/547 (2013.01); B60W 10/02 (2013.01); B60W 10/12 (2013.01); B60W 20/15 (2016.01); F16H 3/66 (2013.01); F16H 2200/0043 (2013.01); F16H 2200/2007 (2013.01); F16H 2200/2043 (2013.01); Y02T 10/6239 (2013.01); Y02T 10/7258 (2013.01); Y10S 903/906 (2013.01); Y10S 903/911 (2013.01); Y10S 903/93 (2013.01)

(58) Field of Classification Search
USPC .................................. 701/22; 475/5; 318/432
See application file for complete search history.

(56) References Cited

U.S. PATENT DOCUMENTS

| | | | |
|---|---|---|---|
| 6,461,266 B1 * | 10/2002 | Weisz .................... | B60K 6/365 475/150 |
| 2006/0063629 A1 * | 3/2006 | Minagawa ............. | B60K 6/365 475/5 |

(Continued)

FOREIGN PATENT DOCUMENTS

| | | |
|---|---|---|
| JP | 2013039906 A | 2/2013 |
| JP | 2013-203109 A | 10/2013 |
| KR | 20130118127 A | 10/2013 |

Primary Examiner — Thomas G Black
Assistant Examiner — Tyler Paige
(74) Attorney, Agent, or Firm — Oliff PLC

(57) ABSTRACT

A hybrid drive apparatus and a control apparatus for controlling the hybrid drive apparatus, a hybrid drive apparatus including a differential device made of a first differential mechanism and second differential mechanism, including four rotary components; and an engine, a first electric motor, second electric motor and an output rotary member, which are respectively connected to four rotary components, wherein one of the four rotary components consists of a rotary element of the first differential mechanism and a rotary element of the second differential mechanism which are selectively connected to each other through a coupling element, and the control apparatus controlling at least one of output torques of the first and second electric motors, to reduce a difference between rotating speeds of the rotary elements of the first and second differential mechanisms selectively connected to each other through the coupling element, to a value not larger than a predetermined threshold value, before the coupling element is brought into an engaged state when the drive system is re-started after the drive system is once placed in an off state.

5 Claims, 10 Drawing Sheets

(51) Int. Cl.
*B60W 10/08* (2006.01)
*B60W 10/02* (2006.01)
*B60W 10/12* (2012.01)
*B60K 6/445* (2007.10)
*F16H 3/66* (2006.01)
*B60K 6/365* (2007.10)
*B60K 6/547* (2007.10)

(56) References Cited

U.S. PATENT DOCUMENTS

| | | | |
|---|---|---|---|
| 2007/0021256 A1* | 1/2007 | Klemen | B60K 6/40 475/5 |
| 2007/0021257 A1* | 1/2007 | Klemen | B60K 6/40 475/5 |
| 2007/0126385 A1* | 6/2007 | Egami | B60K 6/445 318/432 |
| 2007/0145926 A1* | 6/2007 | Egami | B60K 6/26 318/432 |
| 2008/0258656 A1* | 10/2008 | Kawasaki | B60K 6/445 318/148 |
| 2008/0281480 A1* | 11/2008 | Egami | B60K 6/445 701/22 |
| 2013/0041533 A1 | 2/2013 | Kim | |
| 2013/0282213 A1 | 10/2013 | Park | |
| 2015/0367829 A1* | 12/2015 | Kodama | B60W 10/08 701/22 |

* cited by examiner

|  | CL1 | CL2 | BK1 | BK2 |
|---|---|---|---|---|
| HV1 |  |  |  | O |
| HV2 |  | O |  |  |
| EV1 |  |  |  | O |
| EV2 |  | O |  | O |
| 1ST-SPEED | O |  |  | O |
| 2ND-SPEED |  |  | O | O |
| 3RD-SPEED | O | O |  |  |
| 4TH-SPEED |  | O | O |  |

|  | BK | CL | DRIVE MODE |
|---|---|---|---|
| EV-1 | ○ |  | 1 |
| EV-2 | ○ | ○ | 2 |
| HV-1 | ○ |  | 3 |
| HV-2 |  | ○ | 4 | ively connected to each other through a coupling element, and the control apparatus controlling at least one of output torques of the above-described first and second electric motors to reduce a difference between rotating speeds of the above-described rotary element of the above-described first differential mechanism and the above-described rotary element of the above-described second differential mechanism which are selectively connected to each other through the coupling element, to a value not larger than a predetermined threshold value, before the coupling element is brought into an engaged state when said drive system is re-started after the drive system is once placed in an off state.

DRIVE SYSTEM OF A HYBRID VEHICLE

CROSS REFERENCE TO RELATED APPLICATION

The present application claims the priority from Japanese Patent Applications Nos. 2014-126739 filed on Jun. 19, 2014 and 2015-121577 filed on Jun. 16, 2015, the disclosure of which is herein incorporated by reference in its entirety.

BACKGROUND OF THE INVENTION

1. Field of The Invention

The present invention relates to an improvement of a drive system of a hybrid vehicle.

2. Description of Related Art

There is known a drive apparatus of a hybrid vehicle including: a differential device which comprises a first differential mechanism and a second differential mechanism and which includes four rotary components; and an engine, a first electric motor, a second electric motor and an output rotary member, which are respectively connected to the four rotary components, and wherein one of the four rotary components consists of a rotary element of the first differential mechanism and a rotary element of the second differential mechanism which are selectively connected to each other through a coupling element. JP-2013-39906 A1 discloses an example of such hybrid vehicle drive apparatus, which can be selectively placed in a plurality of vehicle drive modes according to respective different combinations of operating states of a plurality of coupling elements.

In the prior art hybrid vehicle drive apparatus described above, a drive system of a hybrid vehicle is temporarily placed in an off state ("Ready-OFF" state), and is then re-started, namely, restored to an on state ("Ready-ON" state), according to a running condition of the hybrid vehicle. When the above-described coupling element for selectively connecting the rotary elements of the first and second differential mechanisms is brought into an engaged state upon re-starting of the drive system, there is a risk of deceleration of the hybrid vehicle felt by its operator due to a difference between rotating speeds of the two rotary elements. This problem was first discovered by the present inventors in a process of an intensive study in an effort to improve the performance of the hybrid vehicle.

SUMMARY OF THE INVENTION

The present invention was made in view of the background art described above. It is therefore an object of the present invention to provide a drive system of a hybrid vehicle, which permits reduction of a risk of deceleration of the hybrid vehicle felt by its operator upon re-starting of the drive system.

The object indicated above is achieved according to a first aspect of the present invention, which provides a drive system of a hybrid vehicle comprising a hybrid drive apparatus and a control apparatus for controlling said hybrid drive apparatus, said hybrid drive apparatus including a differential device which comprises a first differential mechanism and a second differential mechanism and which includes four rotary components; and an engine, a first electric motor, a second electric motor and an output rotary member, which are respectively connected to the above-described four rotary components, and wherein one of the four rotary components consists of a rotary element of the above-described first differential mechanism and a rotary element of the above-described second differential mechanism which are selec- In the drive system according to the first aspect of the present invention described above, the control apparatus is configured to control at least one of the output torques of the first and second electric motors to reduce a difference between rotating speeds of the two rotary elements of the first and second differential mechanisms which are selectively connected to each other through the coupling element, to the value not larger than the predetermined threshold value, before the coupling element is brought into the engaged state when the drive system is re-started after the drive system is once placed in the off state. According to the drive system of the present invention, the degree of deceleration of the hybrid vehicle felt by its operator can be effectively reduced when the drive system is re-started, that is, restored back to a "Ready-ON" state after it is once placed in a "Ready-OFF" state. Namely, the present invention provides a drive system of a hybrid vehicle, which permits reduction of a risk of deceleration of the hybrid vehicle felt by its operator upon re-starting of the drive system.

According to a second aspect of the invention, the drive system according to the first aspect of the invention is configured such that the first differential mechanism includes a first rotary element connected to the first electric motor, a second rotary element connected to the engine, and a third rotary element, while the second differential mechanism includes a first rotary element, a second rotary element connected to the output rotary member, and a third rotary element connected to the third rotary element of the first differential mechanism and the second electric motor, and the coupling element is a clutch configured to selectively connect the second rotary element of the first differential mechanism and the first rotary element of the second differential mechanism to each other. According to this second aspect of the invention, it is possible to effectively reduce the degree of deceleration of the hybrid vehicle felt by its operator upon re-starting of the drive system having a practical arrangement.

According to a third aspect of the invention, the drive system according to the first aspect of the invention is configured such that the first differential mechanism includes a first rotary element, a second rotary element connected to the engine, and a third rotary element connected to the first electric motor, while the second differential mechanism includes a first rotary element connected to the output rotary member and the first rotary element of the first differential mechanism, a second rotary element, and a third rotary element connected to the second electric motor, and the coupling element is a clutch configured to selectively connect the second rotary element of the first differential mechanism and the second rotary element of the second differential mechanism to each other. According to this third aspect of the invention, it is possible to effectively reduce the degree of deceleration of the hybrid vehicle felt by its operator upon re-starting of the drive system having a practical arrangement.

According to a fourth aspect of the invention, the drive system according to any one of the first through third aspects of the invention is configured such that the control apparatus controls at least the output torque of the first electric motor to reduce the difference between the rotating speeds of said rotary elements of said first and second differential mechanisms to the value not larger than the predetermined threshold value, before the coupling element is brought into the engaged state, where the hybrid drive apparatus is switched to any vehicle drive mode in which the engine is operated, when the drive system is re-started after the drive system is once placed in the off state. According to this fourth aspect of the invention, it is possible to reduce the degree of deceleration of the hybrid vehicle felt by its operator, by raising an operating speed of the engine when the hybrid drive apparatus is switched to any vehicle drive mode involving an operation of the engine, upon re-starting of the drive system.

According to a fifth aspect of the invention, the drive system according to any one of the first through third aspects of the invention is configured such that one of the rotary elements of the first and second differential mechanisms which are selectively connected to each other through the coupling element provided as a first coupling element is selectively connected to a stationary member through a second coupling element, and the control apparatus brings the second coupling element into an engaged state, and controls at least the output torque of the second electric motor to reduce the difference between the rotating speeds of the rotary elements of the first and second differential mechanisms to the value not larger than the predetermined threshold value, before the first coupling element is brought into the engaged state, where the hybrid drive apparatus is switched to any vehicle drive mode in which the engine is not operated, when the drive system is re-started after the drive system is once placed in the off state. According to this fifth aspect of the invention, it is possible to reduce the degree of deceleration of the hybrid vehicle felt by its operator, by raising an operating speed of the second electric motor when the hybrid drive apparatus is switched to any vehicle drive mode not involving an operation of the engine, upon re-starting of the drive system.

DETAILED DESCRIPTION OF PREFERRED EMBODIMENT

Figure 1:
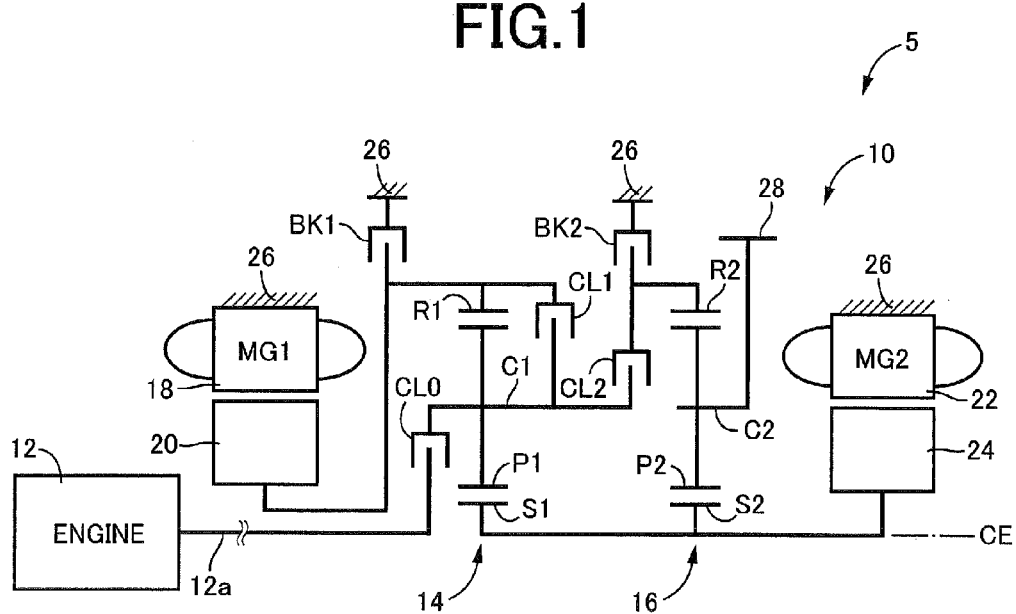
FIG. 1 is a schematic view showing an arrangement of a hybrid vehicle drive apparatus to which the present invention is suitably applicable.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view showing an arrangement of a hybrid vehicle drive apparatus 10 (hereinafter referred to simply as a "drive apparatus 10") to which the present invention is suitably applicable. As shown in FIG. 1, the drive apparatus 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiment, the direction of extension of this axis CE will be referred to as an "axial direction". The drive apparatus 10 is constructed substantially symmetrically with respect to the axis CE. In FIG. 1, a lower half of the drive apparatus 10 is not shown.

The engine 12 is an internal combustion engine such as a gasoline engine, which is operated to generate a drive force by combustion of a fuel such as a gasoline injected into its cylinders. Each of the first and second electric motors MG1 and MG2 is a so-called motor/generator having a function of a motor operated to generate a drive force, and a function of an electric generator operated to generate a reaction force, and is provided with a stator 18, 22 connected to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio $\rho 2$ and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is connected to the rotor 20 of the first electric motor MG1, and the carrier C1 is selectively connectable through a clutch CL0 to an output shaft of the engine 12 in the form of a crankshaft 12a, while the sun gear S1 is fixed to the sun gear S2 of the second planetary gear set 16 and the rotor 24 of the second electric motor MG2. In the second planetary gear set 16, the carrier C2 is fixed to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive apparatus 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively fixing the ring gear R1 to the stationary member in the form of the housing 26 is disposed between the ring gear R1 and the housing 26. A brake BK2 for selectively fixing the ring gear R2 to the housing 26 is disposed between the ring gear R2 and the housing 26.

Each of the clutches CL0, CL1 and CL2 and the brakes BK1 and BK2 is preferably a hydraulically operated coupling device the operating state of which is controlled (which is engaged and released) according to a hydraulic pressure applied thereto from a hydraulic control unit 54. While wet multiple-disc type frictional coupling devices are preferably used as the clutches and brakes, meshing type coupling devices, namely, so-called dog clutches (claw clutches) may also be used. Alternatively, the clutches and brakes may be electromagnetic clutches, magnetic powder clutches and any other clutches the operating states of which are controlled (which are engaged and released) according to electric commands generated from an electronic control device 30.

The drive apparatus 10 is provided with a differential device which comprises the first and second planetary gear sets 14 and 16 and which includes four rotary components when the clutch CL2 is placed in the engaged state. Described more specifically, one of the four rotary components of the differential device consists of the second rotary element in the form of the carrier C1 of the first planetary gear set 14 and the first rotary element in the form of the ring gear R2 of the second planetary gear set 16 which are selectively connected to each other through the clutch CL2. The ring gear R2 of the second planetary gear set 16 selectively connected to the carrier C1 of the first planetary gear set 14 is selectively connected (fixed) to the stationary member in the form of the housing 26 through the brake BK2. In the present embodiment, the clutch CL2 functions as a coupling element, and the brake BK2 functions as a second coupling element.

Figure 2:
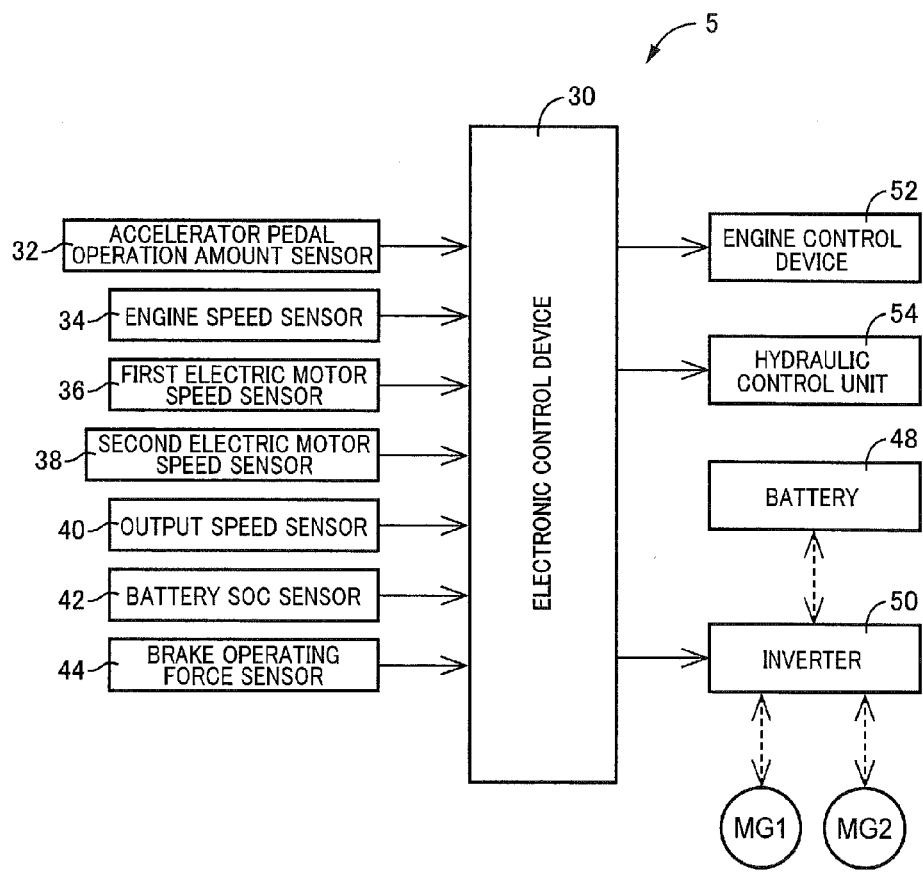
FIG. 2 is a block diagram illustrating major portions of a control system provided to control the drive apparatus of FIG. 1.

FIG. 2 is the block diagram illustrating major portions of a control system provided to control the drive apparatus 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive apparatus 10, such as a drive control of the engine 12 and hybrid drive controls of the first and second electric motors MG1 and MG2. In the present embodiment, the electronic control device 30 serves as a control apparatus for the drive apparatus 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive apparatus 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed NE, that is, an operating speed of the engine 12; an output signal of a first electric motor speed sensor 36 indicative of an operating speed NMG1 of the first electric motor MG1; an output signal of a second electric motor speed sensor 38 indicative of an operating speed $N_{MG2}$ of the second electric motor MG2; an output signal of an output speed sensor 40 indicative of a rotating speed $N_{OUT}$ of the output gear 28, which corresponds to a running speed V of the hybrid vehicle; an output signal of a battery SOC sensor 42 indicative of a stored electric energy amount (state of charge) SOC of a battery 48; and an output signal of a brake operating force sensor 44 indicative of an operating force $P_S$ acting on a foot brake pedal (not shown).

The electronic control device 30 is also configured to generate various control commands to be applied to various portions of the drive apparatus 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL0, CL1 and CL2 and brakes BK1 and BK2, to electromagnetic control valves such as linear solenoid valves provided in the hydraulic control unit 54, so that hydraulic pressures generated by those electromagnetic control valves are controlled to control the operating states of the clutches and brakes.

An operating state of the drive apparatus 10 is controlled through the first and second electric motors MG1 and MG2, such that the drive apparatus 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
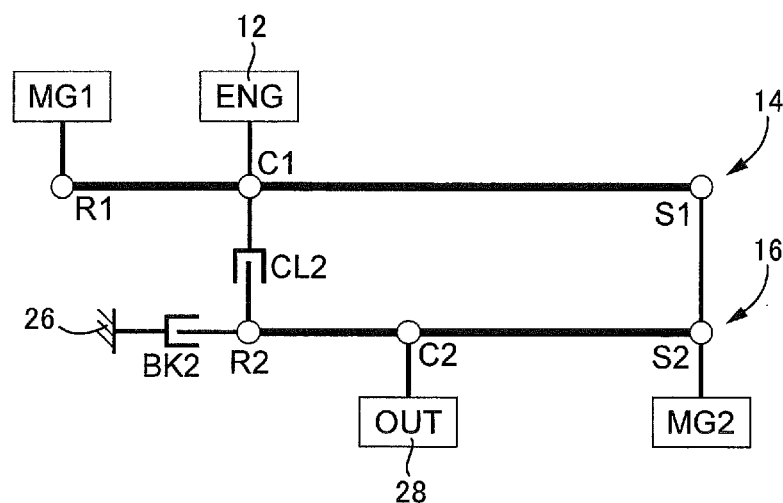
FIG. 3 is a schematic view showing connections of various portions of the drive apparatus of FIG. 1.
FIG. 4 is a table indicating combinations of operating states of clutches and brakes, which correspond to respective vehicle drive modes to be established in the drive apparatus of FIG. 1.

FIG. 3 is the schematic view showing connections of various portions of the drive apparatus 10. In the present drive apparatus 10, the clutch CL0 is preferably placed in the engaged state while the engine 12 is operated, and is brought into the released state as needed depending upon a running condition of the hybrid vehicle. The following description is based on an assumption that the clutch CL0 is placed in the engaged state as shown in FIG. 3. The drive apparatus 10 need not be provided with the clutch CL0. That is, in the absence of the clutch CL0, the crankshaft 12a of the engine 12 may be directly fixed to the carrier C1 of the first planetary gear set 14, or indirectly through a damper, for instance. Further, the drive apparatus 10 need not be provided with the clutch CL1 and the brake BK1, as indicated in FIG. 3.

In the hybrid vehicle provided with the drive apparatus 10 constructed as described above, a selected one of a plurality of vehicle drive modes is established according to the operating states of the engine 12 and the first and second electric motors MG1 and MG2, and the operating states of the clutch CL2, brake BK2, etc. FIG. 4 is the table indicating combinations of the operating states of the clutches CL1 and CL2 and the brakes BK1 and BK2, which correspond to the respective eight vehicle drive modes of the drive apparatus 10. In this table, "o" marks represent the engaged states of the clutches and brakes while blanks represent their released states. Drive modes HV1 and HV2 are hybrid drive modes in which the engine 12 is operated as the vehicle drive power source while the first and second electric motors MG1 and MG2 are operated as needed to generate a vehicle drive force and/or an electric energy. In these hybrid drive modes HV1 and HV2, at least one of the first and second electric motors MG1 and MG2 can be operated to generate a reaction force or placed in a non-loaded free state. Drive modes EV1 and EV2 indicated in FIG. 4 are EV drive modes in which the engine 12 is held at rest while at least one of the first and second electric motors MG1 and MG2 is used as the vehicle drive power source. Drive modes "1st-speed" through "4th-speed" are constant-speed-ratio drive modes which are established when the differential function of the first and second planetary gear sets 14 and 16 is limited, and in which the ratios of the output speeds of the first and second planetary gear sets 14 and 16 to the speed of the rotary motion received from the engine 12 are held constant.

In the drive apparatus 10, the clutch CL1 and the brake BK1 are both placed in the released states, as indicated in FIG. 4, to permit the first planetary gear set 14 to perform the differential function with respect to the rotary motion received from the engine 12, in the hybrid drive modes HV1 and HV2 in which the engine 12 is operated as the vehicle drive power source while the first and second electric motors MG1 and MG2 are operated as needed to generate a drive force and/or an electric energy. The hybrid drive mode HV1 is established when the brake BK2 is placed in the engaged state while the clutch CL2 is placed in the released state, and the hybrid drive mode HV2 is established when the brake BK2 is placed in the released state while the clutch CL2 is placed in the engaged state.

The clutch CL1 and the brake BK1 are both placed in the released states, to permit the first planetary gear set 14 to perform the differential function with respect to the rotary motion received from the engine 12, also in the EV drive modes in which at least one of the first and second electric motors MG1 and MG2 is operated as the vehicle drive power source while the engine 12 is held at rest. The EV drive mode EV1 is established when the brake BK2 is placed in the engaged state while the clutch CL2 is placed in the released state, and the EV drive mode EV2 is established when the brake BK2 and the clutch CL2 are both placed in the engaged states.

In the constant-speed-ratio drive modes in which ratios of the output speeds of the first and second planetary gear sets 14 and 16 to the speed of the rotary motion received from the engine 12 are held constant, either one of the clutch CL1 and the brake BK1 is placed in the engaged state to limit the differential function of the first planetary gear set 14 with respect to the rotary motion received from the engine 12. The constant-speed-ratio drive mode "1st-speed" which is a first-speed drive mode having the highest speed ratio value is established when the clutch CL1 and the brake BK2 are placed in the engaged states while the clutch CL2 and the brake BK1 are placed in the released states. The constant-speed-ratio drive mode "2nd-speed" which is a second-speed drive mode having a speed ratio value lower than that of the constant-speed-ratio drive mode "1st-speed" is established when the clutches CL1 and CL2 are placed in the released states while the brakes BK1 and BK2 are placed in the engaged states. The constant-speed-ratio drive mode "3rd-speed" which is a third-speed drive mode having a speed ratio value lower than that of the constant-speed-ratio drive mode "2nd-speed" is established when the clutches CL1 and CL2 are placed in the engaged states while the brakes BK1 and BK2 are placed in the released states. The constant-speed-ratio drive mode "4th-speed" which is a fourth-speed drive mode having the lowest speed ratio value is established when the clutch CL1 and the brake BK2 are placed in the released states while the clutch CL2 and the brake BK1 are placed in the engaged states.

FIGS. 5-11 are the collinear charts each having straight lines which permit indication thereon of the relative rotating speeds of the various rotary components of the drive apparatus 10 (rotary elements of the first and second planetary gear sets 14 and 16), in respective different states of connection of the rotary elements corresponding to the respective different combinations of the operating states of the clutches CL1 and CL2 and the brakes BK1 and BK2. Each of these collinear charts is defined in a two-dimensional coordinate system having a horizontal axis along which the relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2a, Y2b, Y3, Y4a and Y4b arranged in the order of description in the rightward direction represent the respective relative rotating speeds of the various rotary elements. Namely, a solid line Y1 represents the rotating speed of the ring gear R1 of the first planetary gear set 14 (first electric motor MG1), and a solid line Y2a represents the rotating speed of the carrier C1 of the first planetary gear set 14 (engine 12), while a broken line Y2b represents the rotating speed of the ring gear R2 of the second planetary gear set 16. A broken line Y3 represents the rotating speed of the carrier C2 of the second planetary gear set 16 (output gear 28), and a solid line Y4a represents the rotating speed of the sun gear S1 of the first planetary gear set 14, while a broken line Y4b represents the rotating speed of the sun gear S2 of the second planetary gear set 16 (second electric motor MG2). In FIGS. 5-11, the vertical lines Y2a and Y2b are superimposed on each other, while the vertical lines Y4a and Y4b are superimposed on each other. Since the sun gears S1 and S2 are fixed to each other, the relative rotating speeds of the sun gears S1 and S2 represented by the vertical lines Y4a and Y4b are equal to each other.

In FIGS. 5-11, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2b-Y4b) are determined by the gear ratios ρ1 and ρ2 of the first and second planetary gear sets 14 and 16. Described more specifically, regarding the vertical lines Y1, Y2a and Y4a corresponding to the respective three rotary elements of the first planetary gear set 14, a distance between the vertical lines Y2a and Y4a respectively corresponding to the carrier C1 and the sun gear S1 corresponds to "1", while a distance between the vertical lines Y1 and Y2a respectively corresponding to the ring gear R1 and the carrier C1 corresponds to the gear ratio "ρ1". Regarding the vertical lines Y2b, Y3 and Y4b corresponding to the respective three rotary elements of the second planetary gear set 16, a distance between the vertical lines Y3 and Y4b respectively corresponding to the carrier C2 and the sun gear S2 corresponds to "1", while a distance between the vertical lines Y2b and Y3 respectively corresponding to the ring gear R2 and the carrier C2 corresponds to the gear ratio "ρ2". The drive modes of the drive apparatus 10 will be described by reference to FIGS. 5-11.

Figure 5:
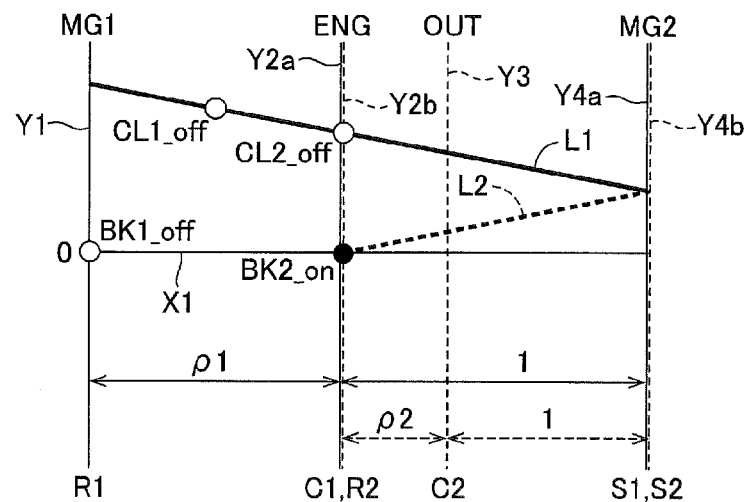
FIG. 5 is a collinear chart having straight lines which permit indication thereon of relative rotating speeds of various rotary components of the drive apparatus of FIG. 1, the collinear chart corresponding to drive modes HV1 and EV1 indicated in FIG. 4.

The collinear chart of FIG. 5 corresponds to the drive mode HV1 of the drive apparatus 10, which is preferably the hybrid drive mode in which the engine 12 is used as the vehicle drive power source while the first and second electric motors MG1 and MG2 are operated as needed to generate a drive force and/or an electric energy. Described by reference to this collinear chart of FIG. 5, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is fixed to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., a torque acting in a positive direction) generated by the second electric motor MG2 in the engaged state of the brake BK2.

Figure 6:
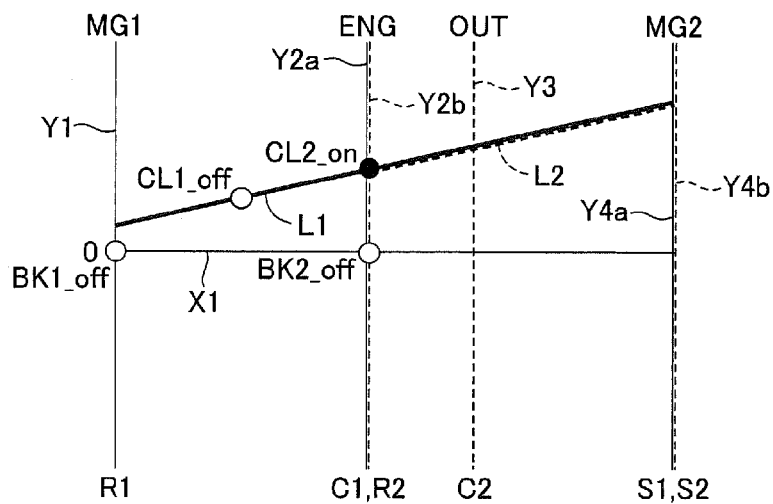
FIG. 6 is a collinear chart having straight lines which permit indication thereon of the relative rotating speeds of the rotary components of the drive apparatus of FIG. 1, the collinear chart corresponding to a drive mode HV2 indicated in FIG. 4.

The collinear chart of FIG. 6 corresponds to the drive mode HV2 of the drive apparatus 10, which is preferably the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 6, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are fixed to each other, are integrally rotated as a single rotary component. Namely, in the drive mode HV2 of the drive apparatus 10, the first and second planetary gear sets 14 and 16 function as a differential device including a total of four rotary components. That is, the drive mode HV2 is a composite split mode in which the four rotary components are connected to each other in the order of description in the rightward direction as seen in FIG. 6. The four rotary components consist of; the ring gear R1 (connected to the first electric motor MG1); a rotary member consisting of the carrier C1 and the ring gear R2 connected to each other (and connected to the engine 12); the carrier C2 (connected to the output gear 28); and a rotary member consisting of the sun gears S1 and S2 fixed to each other (and connected to the second electric motor MG2).

In the drive mode HV2, the carrier C1 of the first planetary gear set 14 and the ring gear R2 of the second planetary gear set 16 are connected to each other in the engaged state of the clutch CL2, so that the carrier C1 and the ring gear R2 are rotated integrally with each other. Accordingly, either one or both of the first and second electric motors MG1 and MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation.

The collinear chart of FIG. 5 also corresponds to the drive mode EV1 of the drive apparatus 10, which is preferably the EV drive mode in which the engine 12 is held at rest while the second electric motor MG2 is used as the vehicle drive power source. Described by reference to this collinear chart of FIG. 5, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is fixed to the stationary member in the form of the housing 26, so that the rotating speed of the ring gear R2 is held zero. In this drive mode EV1, the carrier C2, that is, the output gear 28 is rotated in a positive direction by a positive torque (i.e., a torque acting in a positive direction) generated by the second electric motor MG2 in the second planetary gear set 16. Namely, the hybrid vehicle provided with the drive apparatus 10 can be driven in the forward direction with the positive torque generated by the second electric motor MG2. In this case, the first electric motor MG1 is preferably held in a free state.

Figure 7:
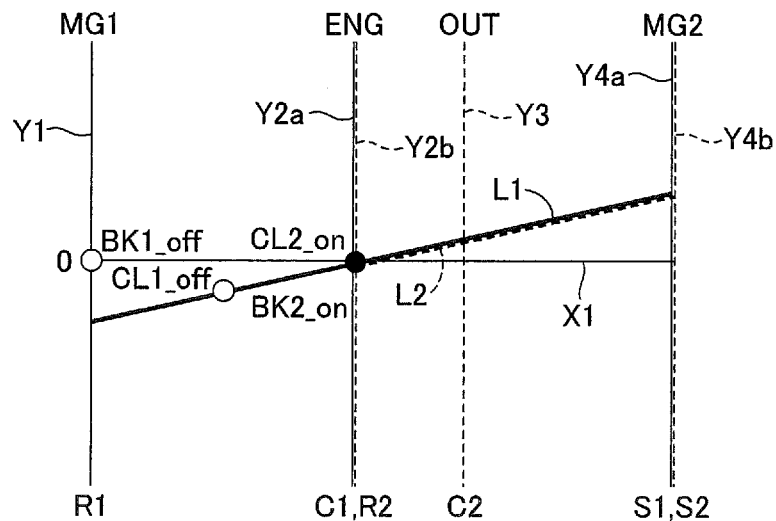
FIG. 7 is a collinear chart having straight lines which permit indication thereon of the relative rotating speeds of the rotary components of the drive apparatus of FIG. 1, the collinear chart corresponding to a drive mode EV2 indicated in FIG. 4.

The collinear chart of FIG. 7 corresponds to the drive mode EV2 of the drive apparatus 10, which is preferably the EV drive mode in which the engine 12 is held at rest while at least one of the first and second electric motors MG1 and MG2 is used as the vehicle drive power source. Described by reference to this collinear chart of FIG. 7, the differential function of the first planetary gear set 14 with respect to the rotary motion received from the engine 12 is permitted in the released states of the clutch CL1 and the brake BK1, and the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2, are fixed to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (acting in the negative direction) generated by the first electric motor MG1, and/or a positive torque (acting in the positive direction) generated by the second electric motor MG2. That is, the hybrid vehicle provided with the drive apparatus 10 can be driven in the forward direction when the torque is generated by at least one of the first and second electric motors MG1 and MG2.

In the drive mode EV2, at least one of the first and second electric motors MG1 and MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

The drive modes "1st-speed" through "4th-speed" indicated in FIG. 4 are the constant-speed-ratio drive modes which are established when the differential functions of the first and second planetary gear sets 14 and 16 are limited and in which the ratio of the output speed of the first or second planetary gear set 14, 16 to the speed of the rotary motion received from the engine 12 is held constant. In the drive modes "1st-speed" through "4th-speed", one of a first coupling element in the form of the clutch CL1, and the brake BK1 is placed in the engaged state to hold constant the ratio of the output speed of the first planetary gear set 14 to the speed of the rotary motion received from the engine 12.

Figure 8:
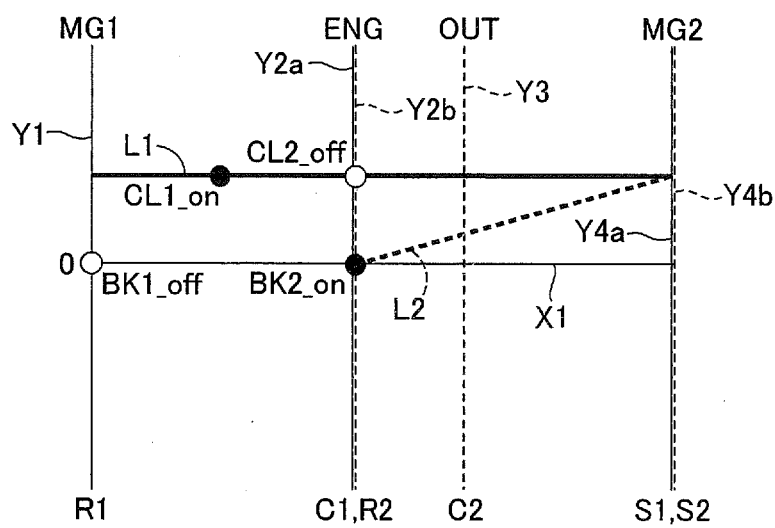
FIG. 8 is a collinear chart having straight lines which permit indication thereon of the relative rotating speeds of the components of the drive apparatus of FIG. 1, the collinear chart corresponding to a constant-speed-ratio drive mode "1st-speed" indicated in FIG. 4.

The collinear chart of FIG. 8 corresponds to the drive mode "1st-speed". Described more specifically by reference to this collinear chart of FIG. 8, the rotary elements of the first planetary gear set 14 are rotated as a single rotary component in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other, so that the drive force received from the engine 12 is transmitted to the sun gear S2 of the second planetary gear set 16 through the first planetary gear set 14 the rotary elements of which are rotated as a single rotary component. In the second planetary gear set 16, the ring gear R2 is fixed to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "1st-speed", the speed of the rotary motion of the engine 12 is changed at a constant ratio corresponding to this drive mode, before the rotary motion is transmitted to the output gear 28. Further, a drive force generated by at least one of the first and second electric motors MG1 and MG2 may be transmitted to the output gear 28.

Figure 9:
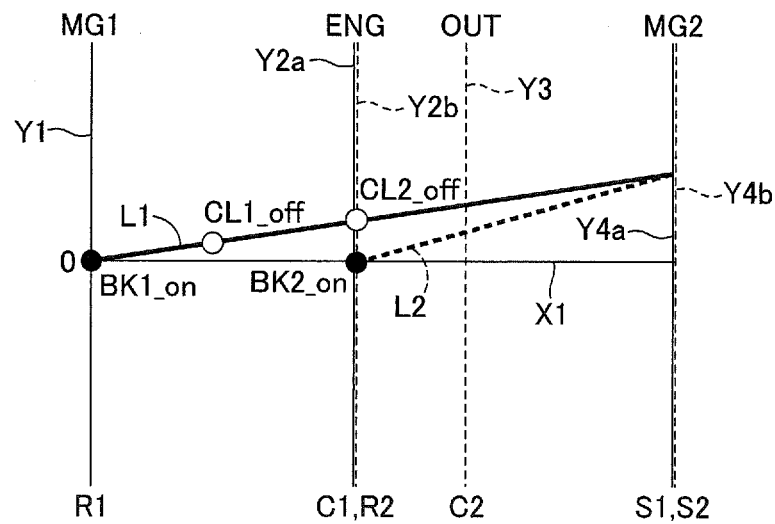
FIG. 9 is a collinear chart having straight lines which permit indication thereon of the relative rotating speeds of the rotary components of the drive apparatus of FIG. 1, the collinear chart corresponding to a constant-speed-ratio drive mode "2nd-speed" indicated in FIG. 4.

The collinear chart of FIG. 9 corresponds to the drive mode "2nd-speed". Described more specifically by reference to this collinear chart of FIG. 9, the ring gear R1 of the first planetary gear set 14 is fixed to the housing 26 through the brake BK1 placed in the engaged state, so that the speed of the rotary motion of the engine 12 transmitted to the carrier C1 is raised by the first planetary gear set 14 before the rotary motion is transmitted from the carrier C1 to the sun gear S2. In the second planetary gear set 16, the ring gear R2 is fixed to the housing 26 through the brake BK2 placed in the engaged state, so that the speed of the rotary motion of the engine 12 transmitted to the sun gear S2 is reduced by the second planetary gear set 16 before the rotary motion is transmitted from the carrier C2 to the output gear 28. In the drive mode "2nd-speed", the speed of the rotary motion of the engine 12 is changed at a constant ratio corresponding to this drive mode, before the rotary motion is transmitted to the output gear 28. Further, a drive force generated by the second electric motor MG2 may be transmitted to the output gear 28.

Figure 10:
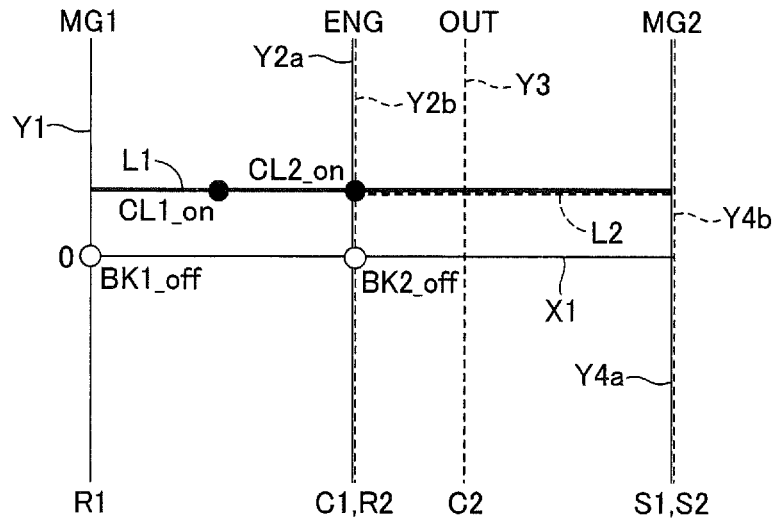
FIG. 10 is a collinear chart having straight lines which permit indication thereon of the relative rotating speeds of the rotary components of the drive apparatus of FIG. 1, the collinear chart corresponding to a constant-speed-ratio drive mode "3rd-speed" indicated in FIG. 4.

The collinear chart of FIG. 10 corresponds to the drive mode "3rd-speed". Described more specifically by reference to this collinear chart of FIG. 10, the rotary elements of the first planetary gear set 14 are rotated as a single rotary component in the engaged state of the clutch CL1. Namely, the operating speeds of the first electric motor MG1 connected to the ring gear R1, the engine 12 connected to the carrier C1 and the second electric motor MG2 connected to the sun gear S1 (sun gear S2) are equal to each other. Further, the rotary elements of the first and second planetary gear sets 14 and 16 are rotated as a single rotary component in the engaged state of the clutch CL2. Accordingly, the drive force of the engine 12 transmitted to the carrier C1 is transmitted from the carrier C2 to the output gear 28 through the first and second planetary gear sets 14 and 16 the rotary elements of which are rotated as the single rotary component. In the drive mode "3rd-speed", the speed of the rotary motion of the engine 12 is changed at a constant ratio (=1) corresponding to this drive mode, before the rotary motion is transmitted to the output gear 28. Further, a drive force generated by at least one of the first and second electric motors MG1 and MG2 may be transmitted to the output gear 28.

Figure 11:
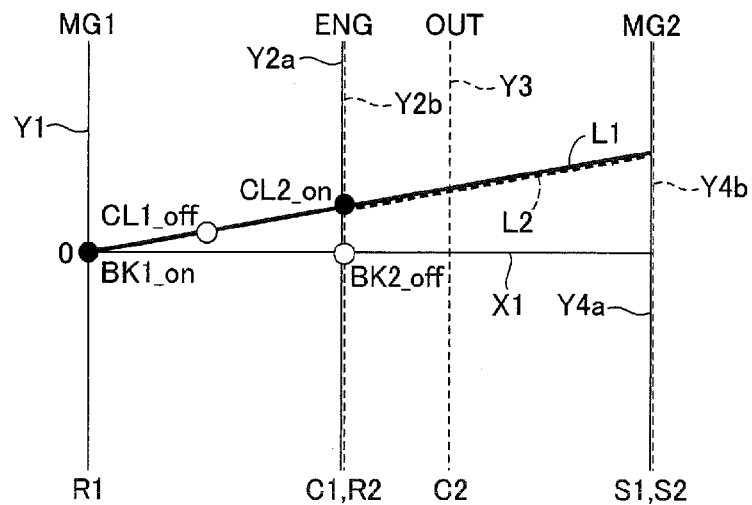
FIG. 11 is a collinear chart having straight lines which permit indication thereon of the relative rotating speeds of the rotary components of the drive apparatus of FIG. 1, the collinear chart corresponding to a constant-speed-ratio drive mode "4th-speed" indicated in FIG. 4.

The collinear chart of FIG. 11 corresponds to the drive mode "4th-speed". Described more specifically by reference to this collinear chart of FIG. 11, the carrier C1 of the first planetary gear set 14 and the ring gear R2 of the second planetary gear set 16 are connected to each other through the clutch CL2 placed in the engaged state, so that the rotary elements of the first and second planetary gear sets 14 and 16 are rotated as a single rotary component. Namely, the operating speeds of the carrier C1 and the ring gear R2 which are connected to each other, and the operating speed of the engine 12 are equal to each other. Further, the ring gear R1 of the first planetary gear set 14 is fixed to the housing 26 through the brake BK1 placed in the engaged state, so that the speed of the rotary motion of the engine 12 transmitted to the carrier C1 and the ring gear R2 connected to each other is raised before the rotary motion is transmitted from the carrier C2 to the output gear 28. In the drive mode "4th-speed", the speed of the rotary motion of the engine 12 is changed at a constant ratio value corresponding to this drive mode, before the rotary motion is transmitted to the output gear 28. Further, a drive force generated by the second electric motor MG2 may be transmitted to the output gear 28.

In the drive modes "1st-speed" through "4th-speed", one of the clutch CL1 and the brake BK1 is placed in the engaged state, as indicated in FIG. 4, so that the differential function of the first and second planetary gear sets 14 and 16 is limited, and a drive force generated by the engine 12 is transmitted to the output gear 28 at a specific one of the different speed ratio values corresponding to the respective drive modes "1st-speed" through "4th-speed". In other words, in the drive modes "1st-speed" through "4th-speed", the engine speed $N_E$ is uniquely determined by the rotating speed of the output gear 28 or the vehicle running speed V. That is, a rate of reduction of the engine speed $N_E$ is determined by a deceleration value of the hybrid vehicle when any one of the drive modes "1st-speed" through "4th-speed" is established. When both the clutch CL1 and the brake BK1 are placed in the released states, on the other hand, the differential function of the first and second planetary gear sets 14 and 16 is permitted.

Figure 12:
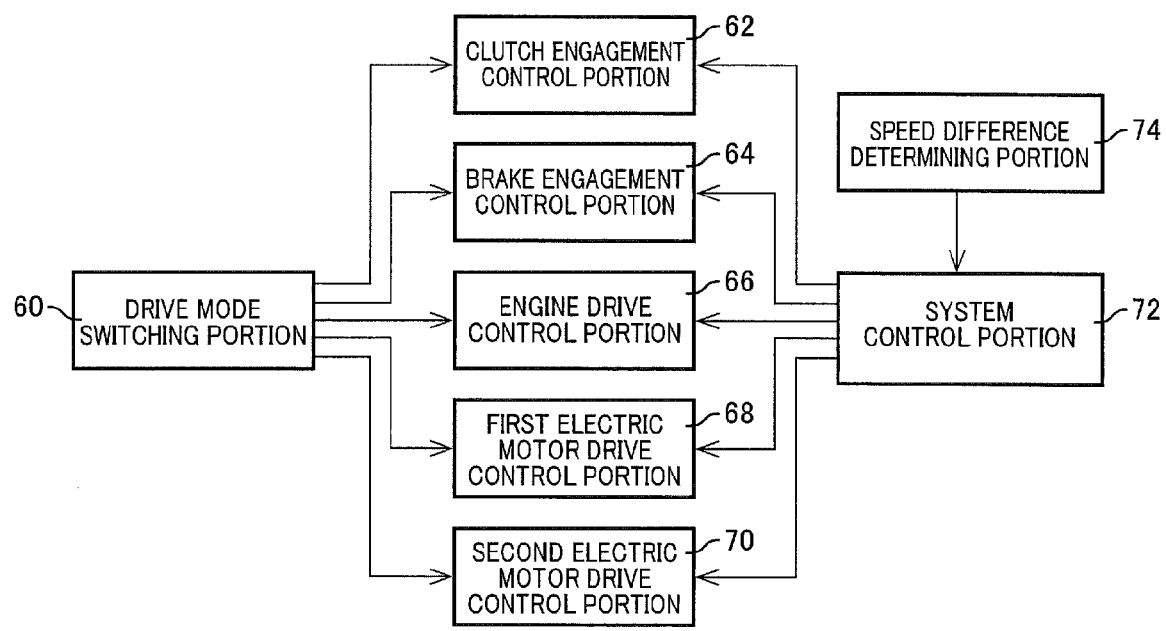
FIG. 12 is a functional block diagram illustrating major control functions of an electronic control device shown in FIG. 2.

FIG. 12 is the functional block diagram illustrating major control functions of the electronic control device 30. The electronic control device 30 incorporates a drive mode switching portion 60, a clutch engagement control portion 62, a brake engagement control portion 64, an engine drive control portion 66, a first electric motor drive control portion 68, a second electric motor drive control portion 70, a system control portion 72, and a speed difference determining portion 74. The drive mode switching portion 60 is configured to determine the drive mode of the drive apparatus 10 that should be established. Described more specifically, the drive mode switching portion 60 selects one of the drive modes indicated in FIG. 4, according to a predetermined drive mode switching map, and on the basis of the accelerator pedal operation amount $A_{CC}$ detected by the accelerator pedal operation amount sensor 32, the vehicle running speed V corresponding to the output speed detected by the output speed sensor 40, and the stored electric energy amount SOC of the battery 48 detected by the battery SOC sensor 42, etc. That is, the drive mode switching portion 60 is basically configured to determine one of the drive modes HV1, HV2, EV1, EV2 and "1st-speed" through "4th-speed" that should be established, according to the predetermined drive mode switching map, and on the basis of the accelerator pedal operation amount $A_{CC}$ detected by the accelerator pedal operation amount sensor 32, the vehicle running speed V corresponding to the output speed detected by the output speed sensor 40, and the stored electric energy amount SOC of the battery 48 detected by the battery SOC sensor 42, etc.

The clutch engagement control portion 62 is configured to control the operating states of the clutches CL1 and CL2 through the hydraulic control unit 54. Described more specifically, the clutch engagement control portion 62 controls output hydraulic pressures of solenoid control valves provided in the hydraulic control unit 54 to control the clutches CL1 and CL2, for controlling the hydraulic pressures $P_{CL1}$ and $P_{CL2}$ which determine the operating states (torque capacities) of the clutches CL1 and CL2. The clutch engagement control portion 62 is preferably configured to control the operating states of the clutches CL1 and CL2, according to the drive mode selected by the drive mode switching portion 60. Namely, the clutch engagement control portion 62 is basically configured to control the torque capacity of the clutch CL1, so as to place the clutch CL1 in the engaged state when the drive mode switching portion 60 has determined that the drive apparatus 10 should be switched to the drive mode "1st-speed" or "3rd-speed", and so as to place the clutch CL1 in the released state when the drive mode switching portion 60 has determined that the drive apparatus 10 should be switched to the drive mode HV1, HV2, EV1, EV2, "2nd-speed" or "4th-speed". Further, the clutch engagement control portion 62 controls the torque capacity of the clutch CL2 so as to place the clutch CL2 in the engaged state when the drive mode switching portion 60 has determined that the drive apparatus 10 should be switched to the drive mode HV2, EV2, "3rd-speed" or "4th-speed", and so as to place the clutch CL2 in the released state when the drive mode switching portion 60 has determined that the drive apparatus 10 should be switched to the drive mode HV1, EV1, "1st-speed" or "2nd-speed".

The brake engagement control portion 64 is configured to control the operating states of the brakes BK1 and BK2 through the hydraulic control unit 54. Described more specifically, the brake engagement control portion 64 controls output hydraulic pressures of solenoid control valves provided in the hydraulic control unit 54 to control the brakes BK1 and BK2, for controlling the hydraulic pressures $P_{BK1}$ and $P_{BK2}$ which determine the operating states (torque capacities) of the brakes BK1 and BK2. The brake engagement control portion 64 is preferably configured to control the operating states of the brakes BK1 and BK2, according to the drive mode selected by the drive mode switching portion 60. Namely, the brake engagement control portion 64 is basically configured to control the torque capacity of the brake BK1, so as to place the brake BK1 in the engaged state when the drive mode switching portion 60 has determined that the drive apparatus 10 should be switched to the drive mode "2nd-speed" or "4th-speed", and so as to place the brake BK1 in the released state when the drive mode switching portion 60 has determined that the drive apparatus 10 should be switched to the drive mode HV1, HV2, EV1, EV2, "1st-speed" or "3rd-speed". Further, the brake engagement control portion 64 controls the torque capacity of the brake BK2, so as to place the brake BK2 in the engaged state when the drive mode switching portion 60 has determined that the drive apparatus 10 should be switched to the drive mode HV1, EV1, EV2, "1st-speed" or "2nd-speed", and so as to place the brake BK2 in the released state when the drive mode switching portion 60 has determined that the drive apparatus 10 should be switched to the drive mode HV2, "3rd-speed" or "4th-speed".

The engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

The first electric motor drive control portion 68 is configured to control an operation of the first electric motor MG1 through the inverter 50. For example, the first electric motor drive control portion 68 controls an amount of an electric energy to be supplied from the battery 48 to the first electric motor MG1 through the inverter 50, so that the first electric motor MG1 generates a required output, that is, a target torque (target MG1 output). The second electric motor drive control portion 70 is configured to control an operation of the second electric motor MG2 through the inverter 50. For example, the second electric motor drive control portion 70 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a required vehicle drive force to be generated by the drive apparatus 10 (output gear 28) is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the first and second electric motor drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

The system control portion 72 is configured to control an operation of a drive system 5 of the hybrid drive vehicle (hybrid drive system 5). The hybrid drive system 5 is constituted by the drive apparatus 10 and the electronic control device 30 which controls the drive apparatus 10. That is, the system control portion 72 controls state of the hybrid drive system 5 about power supply. For example, the system control portion 72 switches the drive system between its "Ready-ON" and "Ready-OFF" states. In the "Ready-ON" state, the drive system 5 is placed in an on state in which the drive apparatus 10 is ready to operate with hybrid drive controls being implemented by the above-described drive mode switching portion 60, engine drive control portion 66, first electric motor drive control portion 68 and second electric motor drive control portion 70 (hereinafter referred to simply as "drive mode switching portion 60, etc.). In the "Ready-OFF" state, the drive system 5 is placed in an off state in which the drive apparatus 10 is held at rest without the hybrid drive controls being implemented by the drive mode switching portion 60, etc. The system control portion 72 is basically configured to switch the drive system between the "Ready-ON" and "Ready-OFF" states, according to an operating state of a power switch (ignition switch).

The speed difference determining portion 74 is configured to determine whether a speed difference $\Delta N$ (absolute value) between the rotating speeds of the carrier C1 of the first planetary gear set 14 and the ring gear R2 of the second planetary gear set 16 which are selectively connected to each other through the coupling element in the form of the clutch CL2 is equal to or smaller than a predetermined threshold value $N_{bo}$ ($\Delta N \leq N_{bo}$) or not. Preferably, this threshold value $N_{bo}$ is obtained by experimentation as an upper limit of the speed difference $\Delta N$ below which a degree of deceleration of the hybrid vehicle felt by its operator can be sufficiently reduced when the clutch CL2 is engaged. In the drive apparatus 10, a rotating speed $N_{C1}$ of the carrier C1 of the first planetary gear set 14 corresponds to the engine speed $N_E$ detected by the engine speed sensor 34, and a rotating speed $N_{R2}$ of the ring gear R2 of the second planetary gear set 16 can be calculated on the basis of the gear ratio ρ2 of the second planetary gear set 16, the second electric motor speed $N_{MG2}$ detected by the second electric motor speed sensor 38, and the output speed $N_{OUT}$ detected by the output speed sensor 40. Namely, the speed difference determining portion 74 calculates the speed difference $\Delta N$ ($=|N_{C1}-N_{R2}|$) between the rotating speed $N_{C1}$ of the carrier C1 of the first planetary gear set 14 and the rotating speed $N_{R2}$ of the ring gear R2 of the second planetary gear set 16, according to a predetermined relationship, and on the basis of the engine speed $N_E$ detected by the engine speed sensor 34, the second electric motor speed $N_{MG2}$ detected by the second electric motor speed sensor 38, and the output speed $N_{OUT}$ detected by the output speed sensor 40, and determines whether the calculated speed difference $\Delta N$ is equal to or smaller than the predetermined threshold value $N_{bo}$ ($\Delta N \leq N_{bo}$) or not.

The system control portion 72 temporarily turns off the drive system 5, as needed, even while the hybrid vehicle is running. Namely, the system control portion 72 may temporarily bring the drive system 5 into the "Ready-OFF" state, and then restore the drive system 5 back to the "Ready-ON" state to re-start the drive system 5. For example, the system control portion 72 once places the drive system 5 in the "Ready-OFF" state and then restores the drive system 5 back to the "Ready-ON" state, to re-start the drive system, when a failure or abnormality of any electric device provided in the drive apparatus 10 is found. For example, re-starting the drive system 5 is achieved by the electronic control device 30.

Figure 13:
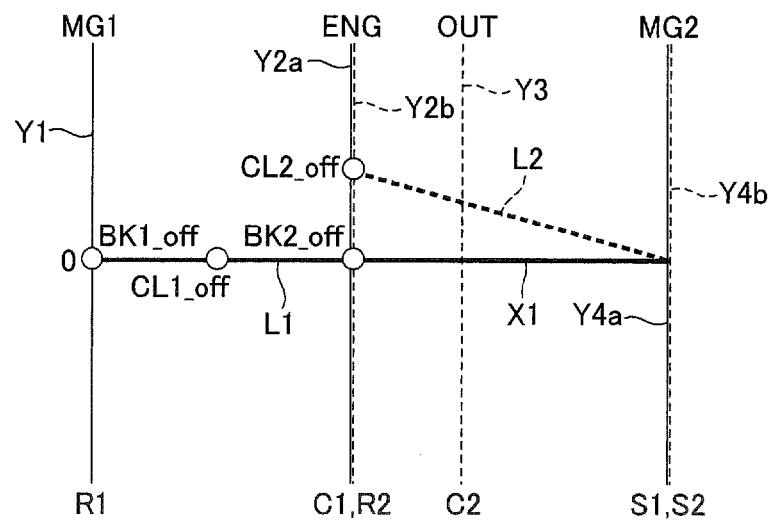
FIG. 13 is a collinear chart indicating the relative rotating speeds of the rotary components of the drive apparatus of FIG. 1 when the drive system is placed in a "Ready-OFF" state.

FIG. 13 is the collinear chart indicating the relative rotating speeds of the rotary components of the drive apparatus 10 when the drive system 5 is placed in the "Ready-OFF" state. In the "Ready-OFF" state of the drive system 5, the output of the engine 12 is zero. Since it is necessary to place the drive apparatus 10 in a power cutoff state, all of the coupling elements are placed in the released states, as indicated in FIG. 13. That is, the clutches CL1 and CL2 and the brakes BK1 and BK2 are all brought into the released states. When the drive system 5 is re-started, that is, restored back to the "Ready-ON" state, the clutch CL2 may be required to be placed in the engaged state. Namely, the drive apparatus 10 is switched to any one of the drive modes indicated in FIG. 4, according to the predetermined drive mode switching map, and on the basis of the vehicle running speed V, the accelerator pedal operation amount $A_{CC}$, the operating force $P_S$ acting on the foot brake pedal, etc., when the drive system 5 is re-started, that is, switched from the "Ready-OFF" state back to the "Ready-ON" state. For example, the clutch CL2 is brought into the engaged state when the drive apparatus 10 is switched to the drive mode HV2, EV2, "3rd-speed" or "4th-speed" after the drive system 5 is once placed in the "Ready-OFF" state. However, if the clutch CL2 is brought into the engaged state while the speed difference $\Delta N$ between the carrier C1 of the first planetary gear set 14 and the ring gear R2 of the second planetary gear set 16 is comparatively large as in FIG. 13, there is a risk of deceleration of the hybrid vehicle felt by its operator due to resistance caused by an engaging action of the clutch CL2.

When the drive system 5 is re-started after it is once placed in the "Ready-OFF" state, the system control portion 72 controls the output torque of at least one of the first and second electric motors MG1 and MG2 to reduce the speed difference $\Delta N$ (between the two rotary elements connected to each other through the clutch CL2, that is, between the carrier C1 of the first planetary gear set 14 and the ring gear R2 of the second planetary gear set 16), to a value not larger than the threshold value $N_{bo}$, before the clutch CL2 is brought into the engaged state. That is, if a negative determination is obtained by the above-described speed difference determining portion 74 when the drive system 5 is switched from the "Ready-OFF" state to the "Ready-ON" state, the system control portion 72 commands at least one of the first and second electric motor drive control portions 68 and 70 to control the operation of at least one of the first and second electric motors MG1 and MG2, such that the speed difference $\Delta N$ is reduced to the value not larger than the threshold value $N_{bo}$, by the output torque of at least one of the first and second electric motors MG1 and MG2. If an affirmative determination is obtained by the speed difference determining portion 74, the system control portion 72 commands the clutch engagement control portion 62 to bring the clutch CL2 into the engaged state.

Figure 14:
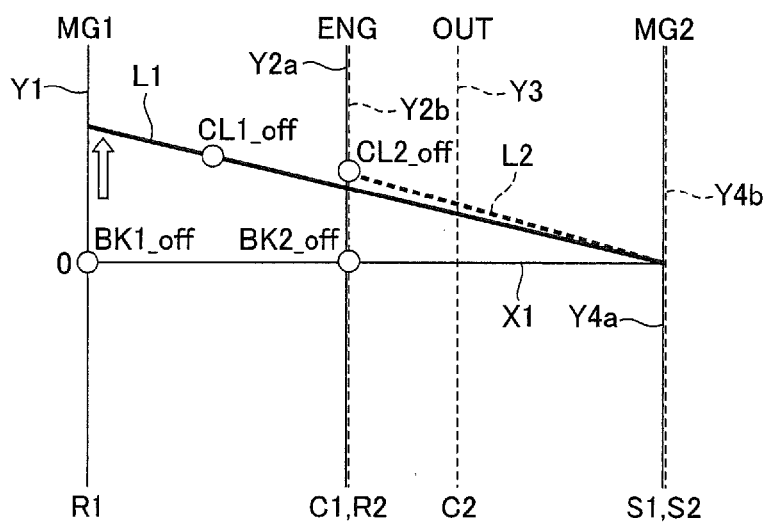
FIG. 14 is a collinear chart indicating the relative rotating speeds of the rotary components of the drive apparatus of FIG. 1 when the drive apparatus is switched to an engine operating drive mode upon re-starting of the drive system.

Preferably, the system control portion 72 is configured to bring the clutch CL2 into the engaged state after the speed difference $\Delta N$ (between the carrier C1 of the first planetary gear set 14 and the ring gear R2 of the second planetary gear set 16) is reduced to the value not larger than the threshold value $N_{bo}$, by controlling the output torque of the first electric motor MG1, when the drive apparatus 10 is switched to any vehicle drive mode involving an operation of the engine 12, upon re-starting of the drive system 5 after it is once placed in the "Ready-OFF" state. For instance, the system control portion 72 implements the control of the output torque of the first electric motor MG1 when the drive apparatus 10 is switched to the drive mode HV2, "3rd-speed" or "4th-speed" after the drive system 5 is once placed in the "Ready-OFF" state. FIG. 14 is the collinear chart indicating the relative rotating speeds of the rotary components of the drive apparatus 10 when the drive apparatus 10 is switched to any drive mode involving an operation of the engine 12 upon re-starting of the drive system. If the speed difference $\Delta N$ is larger than the threshold value $N_{bo}$, the first electric motor MG1 is operated to generate a positive torque to raise the engine speed $N_E$ for thereby reducing the speed difference $\Delta N$, as indicated by a white arrow in FIG. 14. At this time, the second electric motor MG2 may be operated to generate a torque for reducing the speed difference $\Delta N$. Thus, the clutch CL2 is brought into the engaged state after the speed difference $\Delta N$ is reduced to the value not larger than the threshold value $N_{bo}$, so that the degree of deceleration of the hybrid vehicle felt by its operator can be effectively reduced.

Figure 15:
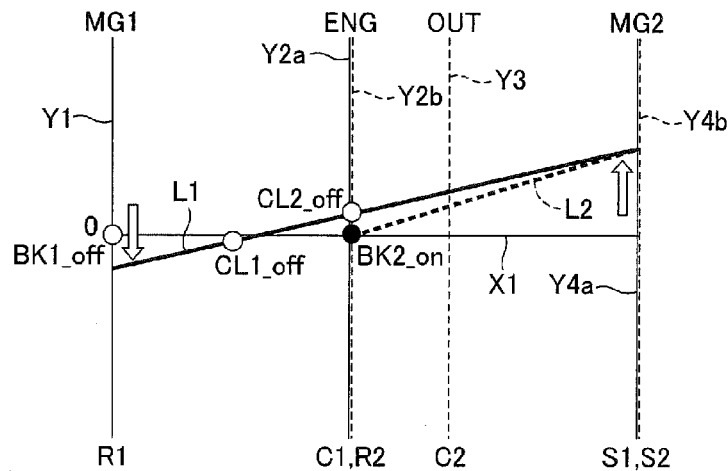
FIG. 15 is a collinear chart indicating the relative rotating speeds of the rotary components of the drive apparatus of FIG. 1 when the drive apparatus is switched to an engine non-operating drive mode upon re-starting of the drive system.

Preferably, the system control portion 72 is configured to bring the clutch CL2 into the engaged state after the second coupling element in the form of the brake BK2 is brought into the engaged state, and the speed difference $\Delta N$ (between the carrier C1 of the first planetary gear set 14 and the ring gear R2 of the second planetary gear set 16) is reduced to the value not larger than the threshold value $N_{bo}$, by controlling the output torque of the second electric motor MG2, when the drive apparatus 10 is switched to any vehicle drive mode not involving an operation of the engine 12 (to one of the drive modes EV in which the engine 12 is not operated), upon re-starting of the drive system 5 after it is once placed in the "Ready-OFF" state. For instance, the system control portion 72 implements the control of the output torque of the second electric motor MG2 when the drive apparatus 10 is switched to the drive mode EV2 after the drive system 5 is once placed in the "Ready-OFF" state. FIG. 15 is the collinear chart indicating the relative rotating speeds of the rotary components of the drive apparatus 10 when the drive apparatus 10 is switched to the drive mode not involving an operation of the engine 12 upon re-starting of the drive system 5. If the speed difference ΔN is larger than the threshold value $N_{bo}$, the brake BK2 is brought into the engaged state, and the second electric motor MG2 is operated to generate a positive torque with a rise of its operating speed $N_{MG2}$ to reduce the speed difference ΔN, as indicated by a white arrow in FIG. 15. At this time, the first electric motor MG1 may be operated to generate a negative torque to rapidly reduce the speed difference ΔN, as indicated in FIG. 15. Thus, the clutch CL2 is brought into the engaged state after the speed difference ΔN is reduced to the value not larger than the threshold value $N_{bo}$, so that the degree of deceleration of the hybrid vehicle felt by its operator can be effectively reduced.

Figure 16:
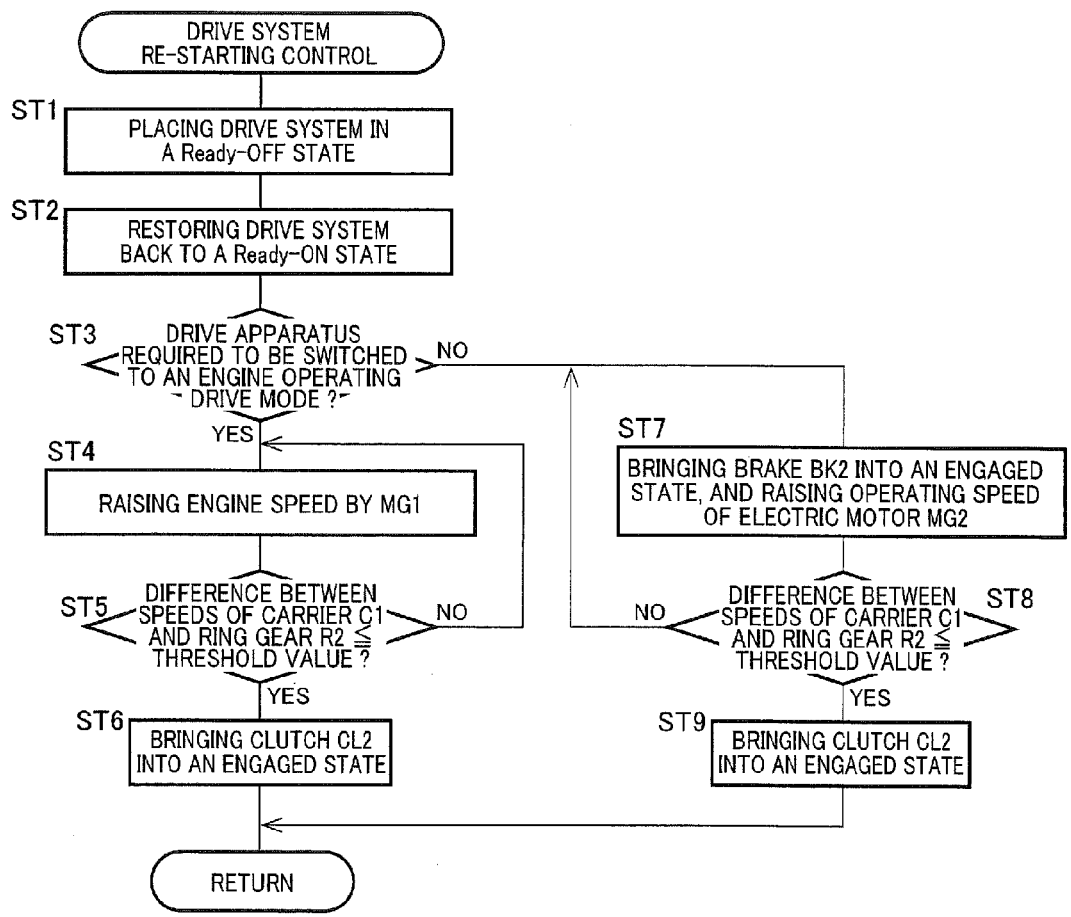
FIG. 16 is a flow chart illustrating an example of a drive system re-starting control implemented by the electronic control device of FIG. 2.

FIG. 16 is the flow chart illustrating an example of a drive system re-starting control implemented by the electronic control device 30. This drive system re-starting control is implemented with a predetermined cycle time.

The drive system re-starting control is initiated with a step ST1 to temporarily place the drive system 5 in the "Ready-OFF" state. Then, the control flow goes to a step ST2 to restore the drive system 5 back to the "Ready-ON" state to re-start the drive system. The control flow then goes to a step ST3 to determine whether the drive apparatus 10 is required to be switched to the drive mode HV2, "3rd-speed", "4th-speed" or any other drive mode in which the engine 12 is operated. If a negative determination is obtained in the step ST3, namely, if it is determined that the drive apparatus 10 is required to be switched to the drive mode EV2 or any other drive mode in which the engine 12 is not operated, the control flow goes to a step ST7 and the following steps. If an affirmative determination is obtained in the step ST3, the control flow goes to a step ST4 in which the first electric motor MG1 is operated to generate a torque for raising the operating speed NE of the engine 12, that is, the output torque of the first electric motor MG1 is controlled to reduce the speed difference ΔN (between the rotating speeds of the carrier C1 of the first planetary gear set 14 and the ring gear R2 of the second planetary gear set 16) to a value not larger than the predetermined threshold value $N_{bo}$. The control flow then goes to a step ST5 to determine whether the speed difference ΔN is equal to or smaller than the threshold value $N_{bo}$ or not. If a negative determination is obtained in the step ST5, the control flow goes back to the step ST4. If an affirmative determination is obtained in the step ST5, the control flow goes to a step ST6 to bring the clutch CL2 into the engaged state, and the present control routine is terminated. In the above-indicated step ST7, the brake BK2 is brought into the engaged state, and the operating speed $N_{MG2}$ of the second electric motor MG2 is raised. That is, the output torque of the second electric motor MG2 is controlled to reduce the speed difference ΔN to a value not larger than the threshold value $N_{bo}$. Then, the control flow goes to a step ST8 to determine whether the speed difference ΔN is equal to or smaller than the threshold value $N_{bo}$ or not. If a negative determination is obtained in the step ST8, the control flow goes back to the step ST7. If an affirmative determination is obtained in the step ST8, the control flow goes to a step ST9 to bring the clutch CL2 into the engaged state, and the present control routine is terminated.

It will be understood from the foregoing description of the drive system re-starting control that the step ST3 corresponds to an operation of the drive mode switching portion 60, and the steps ST6 and ST9 correspond to an operation of the clutch engagement control portion 62, while the step ST7 corresponds to an operation of the brake engagement control portion 64, and that the steps ST4 and ST7 respectively correspond to operations of the first electric motor drive control portion 68 and the second electric motor drive control portion 70, and the steps ST1-ST9 correspond to an operation of the system control portion 72, while the steps ST5 and ST8 correspond to an operation of the speed difference determining portion 74.

The drive system 5 according to the present invention described above comprises the system control portion 72 which is configured to control at least one of the output torques of the first and second electric motors MG1 and MG2 to reduce the speed difference ΔN between the rotating speeds of the two rotary elements which are selectively connected to each other through the coupling element in the form of the clutch CL2, that is, the carrier C1 of the first planetary gear set 14 and the ring gear R2 of the second planetary gear set 16, to a value not larger than the predetermined threshold value $N_{bo}$, before the clutch CL2 is brought into the engaged state when the drive system is re-started after the drive system 5 is once placed in the off state, that is, in the "Ready-OFF" state. Accordingly, the degree of deceleration of the hybrid vehicle felt by its operator can be effectively reduced when the drive system is re-started, that is, restored back to the "Ready-ON" state after it is once placed in the "Ready-OFF" state. Namely, the present embodiment provides a control apparatus in the form of the electronic control device 30 for the drive apparatus 10 of the hybrid vehicle, which permits reduction of a risk of deceleration of the hybrid vehicle felt by its operator upon re-starting of a drive system 5.

The drive apparatus 10 to be controlled by the electronic control device 30 is configured such that the first differential mechanism in the form of the first planetary gear set 14 includes the first rotary element in the form of the ring gear R1 connected to the first electric motor MG1, the second rotary element in the form of the carrier C1 connected to the engine 12, and the third rotary element in the form of the sun gear S1, while the second differential mechanism in the form of the second planetary gear set 16 includes the first rotary element in the form of the ring gear R2, the second rotary element in the form of the carrier C2 connected to the output rotary member in the form of the output gear 28, and the third rotary element in the form of the sun gear S2 connected to the sun gear S1 of the first planetary gear set 14 and the second electric motor MG2, and the coupling element in the form of the clutch CL2 is configured to selectively connect the carrier C1 of the first planetary gear set 14 and the ring gear R2 of the second planetary gear set 16 to each other. Accordingly, it is possible to effectively reduce the degree of deceleration of the hybrid vehicle felt by its operator upon re-starting of the drive system 5 which has a practical arrangement.

The system control portion 72 is further configured to control at least the output torque of the first electric motor MG1 to reduce the speed difference ΔN between the carrier C1 of the first planetary gear set 14 and the ring gear R2 of the second planetary gear set 16 to the value not larger than the predetermined threshold value $N_{bo}$, before the clutch CL2 is brought into the engaged state, where the drive apparatus 10 is switched to any vehicle drive mode in which the engine 12 is operated, when the drive system 5 is re-started after the drive system 5 is once placed in the off state. Accordingly, it is possible to effectively reduce the degree of deceleration of the hybrid vehicle felt by its operator, by raising the engine speed $N_E$ when the drive apparatus 10 is switched to any vehicle drive mode involving an operation of the engine 12, upon re-starting of the drive system 5.

The drive apparatus 10 to be controlled by the electronic control device 30 is configured such that the ring gear R2 of the second planetary gear set 16 which is selectively connected to the carrier C1 of the first planetary gear set 14 through the first coupling element in the form of the clutch CL2 is selectively connected to the stationary member in the form of the housing 26 through the second coupling element in the form of the brake BK2, and the system control portion 72 brings the brake BK2 into the engaged state, and controls at least the output torque of the second electric motor MG2 to reduce the speed difference $\Delta N$ between the carrier C1 and the ring gear R2 of the first and second planetary gear sets 14 and 16 to the value not larger than the predetermined threshold value $N_{bo}$, before the clutch CL2 is brought into the engaged state, where the drive apparatus 10 is switched to any vehicle drive mode in which the engine 12 is not operated, when the drive system 5 is re-started after the drive system 5 is once placed in the off state. Accordingly, it is possible to effectively reduce the degree of deceleration of the hybrid vehicle felt by its operator, by raising the operating speed $N_{MG2}$ of the second electric motor MG2 when the drive apparatus 10 is switched to any vehicle drive mode not involving an operation of the engine 12, upon re-starting of the drive system 5.

Second Embodiment

Another preferred embodiment of the present invention will be described in detail by reference to the drawings. In the following description, the same reference signs will be used to identify the same elements in the different embodiments, which will not be described redundantly.

Figures 17, 18:
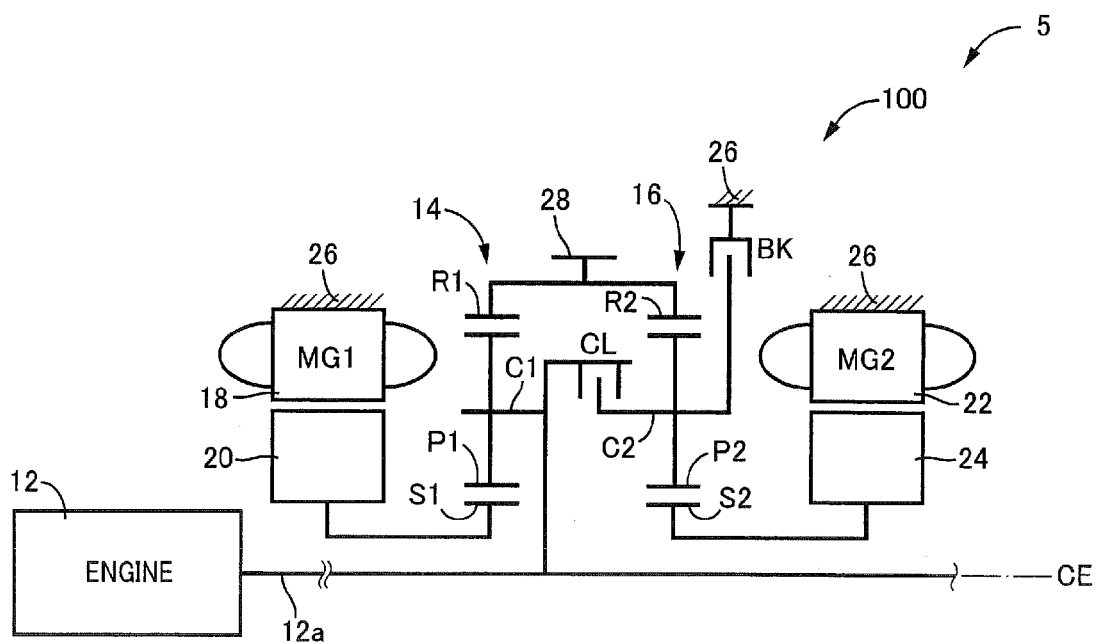
FIG. 17 is a schematic view showing an arrangement of another hybrid vehicle drive apparatus to which the present invention is suitably applicable.
FIG. 18 is a table indicating combinations of operating states of clutches and brakes, which correspond to respective vehicle drive modes to be established in the drive apparatus of FIG. 17.

FIG. 17 is the schematic view showing an arrangement of another hybrid vehicle drive apparatus 100 (hereinafter referred to simply as a "drive apparatus 100") to which this invention is suitably applicable. In the drive apparatus 100, the rotor 20 of the first electric motor MG1 is fixed to the sun gear S1 of the first planetary gear set 14, and the crankshaft 12a of the engine 12 is fixed to the carrier C1 of the first planetary gear set 14. The ring gear R1 of the first planetary gear set 14 and the ring gear R2 of the second planetary gear set 16 are fixed to each other, and the sun gear S2 of the second planetary gear set 16 is fixed to the rotor 24 of the second electric motor MG2. The ring gear R2 of the second planetary gear set 16 fixed to the ring gear R1 of the first planetary gear set 14 is fixed to the output rotary member in the form of the output gear 28. The carrier C1 of the first planetary gear set 14 and the carrier C2 of the second planetary gear set 16 are selectively connected to each other through a clutch CL. The carrier C2 of the second planetary gear set 16 is selectively fixed to the stationary member in the form of the housing 26 through a brake BK. In this embodiment, the hybrid drive system 5 is constituted by the drive apparatus 100 and the electronic control device 30 which controls the drive apparatus 100.

Each of the clutch CL and brake BK is preferably a hydraulically operated coupling device the operating state of which is controlled (which is engaged and released) according to the hydraulic pressure applied thereto from the hydraulic control unit 54. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from the electronic control device 30.

In the drive apparatus 100, the differential device comprising the first and second planetary gear sets 14 and 16 includes four rotary components when the clutch CL is placed in the engaged state. Described more specifically, one of the four rotary components of the differential device consists of a second rotary element in the form of the carrier C1 of the first planetary gear set 14 and a second rotary element in the form of the carrier C2 of the second planetary gear set 16, which are selectively connected to each other through a coupling element in the form of the clutch CL. The carrier C2 of the second planetary gear set 16 selectively connected to the carrier C1 of the first planetary gear set 14 is selectively connected (fixed) to the stationary member in the form of the housing 26 through a second coupling element in the form of the brake BK.

In the hybrid vehicle provided with the drive apparatus 100 constructed as described above, a selected one of a plurality of vehicle drive modes is established according to the operating states of the engine 12 and the first and second electric motors MG1 and MG2, and the operating states of the clutch CL, brake BK. FIG. 18 is the table indicating combinations of the operating states of the clutch CL and the brake BK, which correspond to the respective four vehicle drive modes of the drive apparatus 100. In this table, "o" marks represent the engaged states of the clutch CL and brake BK while blanks represent their released states. Drive modes EV-1 and EV-2 indicated in FIG. 18 are electric motor drive modes (EV drive modes) in which the engine 12 is held at rest while at least one of the first and second electric motors MG1 and MG2 is operated as a vehicle drive power source. Drive modes HV-1 and HV-2 are hybrid drive modes (HV drive modes) in which the engine 12 is operated as the vehicle drive power source while the first and second electric motors MG1 and MG2 are operated to generate a drive force and/or an electric energy as needed. In these hybrid drive modes, at least one of the first and second electric motors MG1 and MG2 may be operated to generate a reaction force or placed in a non-loaded free state.

The electric motor drive mode EV-1 which is a first drive mode of the drive apparatus 100 is established when the brake BK is placed in the engaged state while the clutch CL is placed in the released state, as indicated in FIG. 18, and the electric motor drive mode EV-2 which is a second drive mode of the drive apparatus 100 is established when both of the brake BK and the clutch CL are placed in the engaged states. The hybrid drive mode HV-1 which is a third drive mode of the drive apparatus 100 is established when the brake BK is placed in the engaged state while the clutch CL is placed in the released state, and the hybrid drive mode HV-2 which is a fourth drive mode of the drive apparatus 100 is established when the clutch CL is placed in the engaged state while the brake BK is placed in the released state.

In the electric motor drive mode EV-1 indicated in FIG. 18, the carrier C1 of the first planetary gear set 14 and the carrier C2 of the second planetary gear set 16 are rotatable relative to each other in the released state of the clutch CL, and the carrier C2 of the second planetary gear set 16 is fixed to the stationary member in the form of the housing 26 in the engaged state of the brake BK, so that the rotating speed of the carrier C2 is held zero. In this electric motor drive mode EV-1, the sun gear S2 and the ring gear R2 of the second planetary gear set 16 are rotated in the opposite directions.

In other words, the ring gear R2, that is, the output gear 28 is rotated in a positive direction by a negative torque generated by the second electric motor MG2. Namely, the hybrid vehicle provided with the drive apparatus 100 can be driven in the forward direction with the negative torque generated by the second electric motor MG2. In this case, the first electric motor MG1 is preferably held in a free state. In this electric motor drive mode EV-1, the carriers C1 and C2 are permitted to be rotated relative to each other, so that the hybrid vehicle can be driven in the electric motor drive mode similar to an EV drive mode which is established in a vehicle provided with a so-called "THS" (Toyota Hybrid System) and in which the carrier C2 is fixed to the stationary member.

In the electric motor drive mode EV-2 indicated in FIG. 18, the carrier C1 of the first planetary gear set 14 and the carrier C2 of the second planetary gear set 16 are not rotatable relative to each other, in the engaged state of the clutch CL. Further, the carrier C2 of the second planetary gear set 16 and the carrier C1 of the first planetary gear set 14 which are connected to each other are fixed to the stationary member in the form of the housing 26, in the engaged state of the brake BK, so that the rotating speeds of the carriers C1 and C2 are held at zero. In this electric motor drive mode EV-2, the sun gear S1 and the ring gear R1 of the first planetary gear set 14 are rotated in the opposite directions, and the sun gear S2 and the ring gear R2 of the second planetary gear set 16 are rotated in the opposite directions. In other words, the ring gears R1 and R2, that is, the output gear 28 is rotated in a positive direction by a negative torque generated by the first electric motor MG1 or the second electric motor MG2, that is, the hybrid vehicle provided with the drive apparatus 100 is driven in the forward direction by the negative torque generated by at least one of the first and second electric motors MG1 and MG2.

In the hybrid drive mode HV-1 indicated in FIG. 18, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is fixed to the stationary member in the form of the housing 26, so that the rotating speed of the carrier C2 is held at zero. In this hybrid drive mode HV-1, the engine 12 is operated, and the output gear 28 is rotated by the output torque of the engine 12. In this case, the first electric motor MG1 is operated to generate a reaction torque, to permit the output of the engine 12 to be transmitted to the output gear 28. In the engaged state of the brake BK, the sun gear S2 and the ring gear R2 of the second planetary gear set 16 are rotated in the opposite directions. In other words, the ring gears R1 and R2, that is, the output gear 28 is rotated in the positive direction by the negative torque generated by the second electric motor MG2.

In the hybrid drive mode HV-2 indicated in FIG. 18, the carrier C1 of the first planetary gear set 14 and the carrier C2 of the second planetary gear set 16 are not rotatable relative to each other, in the engaged state of the clutch CL, so that the carriers C1 and C2 serve as a single rotary component. The ring gears R1 and R2 which are fixed to each other serve as a single rotary component. That is, the first and second planetary gear sets 14 and 16 cooperate to function as a differential device having four rotary components when the drive apparatus 100 is placed in the hybrid drive mode HV-2.

The speed difference determining portion 74 provided for the drive apparatus 100 is configured to determine whether a speed difference $\Delta N$ between rotating speeds of the carrier C1 of the first planetary gear set 14 and the carrier C2 of the second planetary gear set 16 which are selectively connected to each other through the coupling element in the form of the clutch CL is equal to or smaller than a predetermined threshold value $N_{bo}$ ($\Delta N \leq N_{bo}$) or not. In the drive apparatus 100, the rotating speed $N_{C1}$ of the carrier C1 of the first planetary gear set 14 corresponds to the engine speed NE detected by the engine speed sensor 34, and the rotating speed $N_{C2}$ of the carrier C2 of the second planetary gear set 16 can be calculated on the basis of the gear ratio $\rho 2$ of the second planetary gear set 16, the second electric motor speed $N_{MG2}$ detected by the second electric motor speed sensor 38, and the output speed $N_{OUT}$ detected by the output speed sensor 40. Namely, the speed difference determining portion 74 calculates the speed difference $\Delta N$ ($=|N_{C1}-N_{C2}|$) between the rotating speed $N_{C1}$ of the carrier C1 of the first planetary gear set 14 and the rotating speed $N_{C2}$ of the carrier C2 of the second planetary gear set 16, according to a predetermined relationship, and on the basis of the engine speed $N_E$ detected by the engine speed sensor 34, the second electric motor speed $N_{MG2}$ detected by the second electric motor speed sensor 38, and the output speed $N_{OUT}$ detected by the output speed sensor 40, and determines whether the calculated speed difference $\Delta N$ is equal to or smaller than the predetermined threshold value $N_{bo}$ ($\Delta N \leq N_{bo}$) or not.

Figure 19:
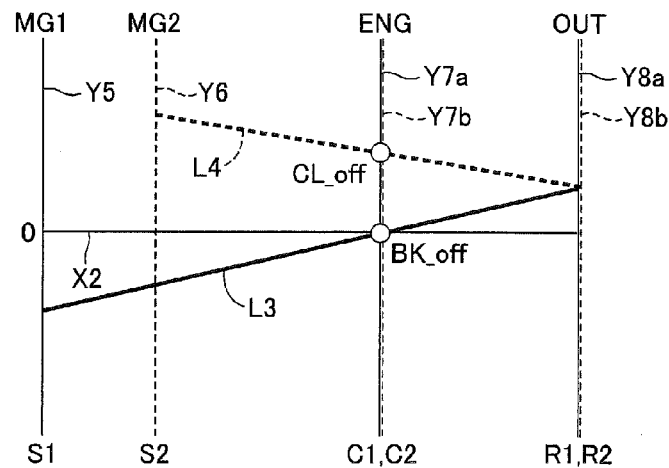
FIG. 19 is a collinear chart illustrating relative rotating speeds of various rotary components of the drive apparatus of FIG. 17 when the drive system is placed in a "Ready-OFF" state.
Figure 20:
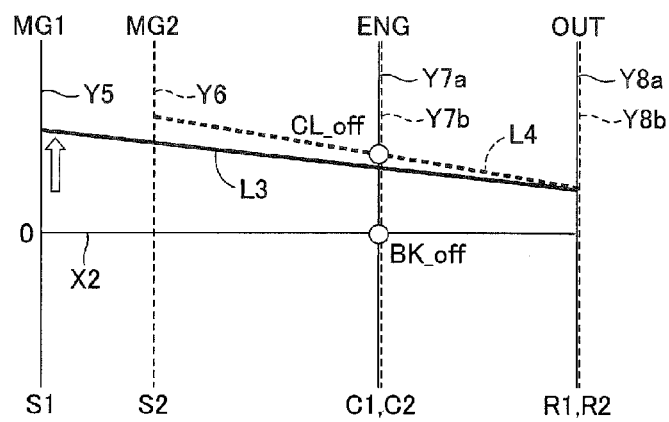
FIG. 20 is a collinear chart indicating the relative rotating speeds of the rotary components of the drive apparatus of FIG. 17 when the drive apparatus is switched to an engine operating drive mode upon re-starting of the drive system.
Figure 21:
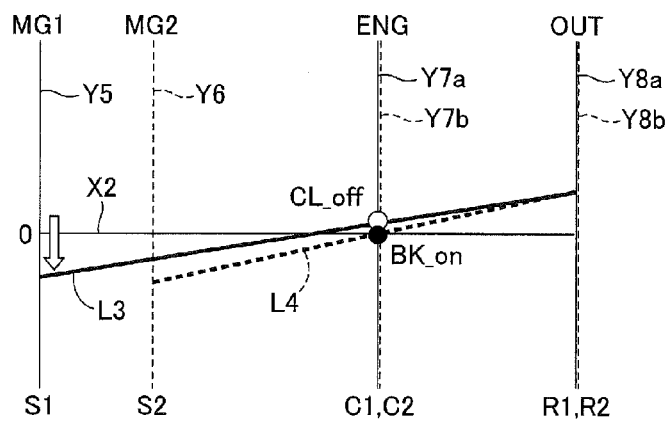
FIG. 21 is a collinear chart indicating the relative rotating speeds of the rotary components of the drive apparatus of FIG. 17 when the drive apparatus is switched to an engine non-operating drive mode upon re-starting of the drive system.

FIGS. 19-21 are the collinear charts each having straight lines which permit indication thereon of the relative rotating speeds of the various rotary components of the drive apparatus 100 (rotary elements of the first and second planetary gear sets 14 and 16), in respective different states of connection of the rotary elements corresponding to the respective different combinations of the operating states of the clutch CL and the brake BK. Each of these collinear charts is defined in a two-dimensional coordinate system having a horizontal axis along which the relative gear ratios $\rho$ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X2 represents the rotating speed of zero, while vertical lines Y5, Y6, Y7a, Y7b, Y8a and Y8b arranged in the order of description in the rightward direction represent the respective relative rotating speeds of the various rotary elements. Namely, a solid line Y5 represents the rotating speed of the sun gear S1 of the first planetary gear set 14 (first electric motor MG1), and a broken line Y6 represents the rotating speed of the sun gear S2 of the second planetary gear set 16 (second electric motor MG2), while a solid line Y7a represents the rotating speed of the carrier C1 of the first planetary gear set 14 (engine 12). A broken line Y7b represents the rotating speed of the carrier C2 of the second planetary gear set 16, and a solid line Y8a represents the rotating speed of the ring gear R1 of the first planetary gear set 14 (output gear 28), while a broken line Y8b represents the rotating speed of the ring gear R2 of the second planetary gear set 16. In FIGS. 19-21, the vertical lines Y7a and Y7b are superimposed on each other, while the vertical lines Y8a and Y8b are superimposed on each other. Since the ring gears R1 and R2 are fixed to each other, the relative rotating speeds of the ring gears R1 and R2 represented by the vertical lines Y8a and Y8b are equal to each other. In FIGS. 19-21, a solid line L3 represents the relative rotating speeds of the three rotary elements of the first planetary gear set 14, while a broken line L4 represents the relative rotating speeds of the three rotary elements of the second planetary gear set 16.

FIG. 19 is the collinear chart indicating the relative rotating speeds of the rotary components of the drive apparatus 100 when the drive system 5 is placed in the "Ready-OFF" state. In the "Ready-OFF" state of the drive system 5, the output of the engine 12 is zero. Since it is necessary to place the drive apparatus 100 in a power cutoff state, all of the coupling elements are placed in the released states, as indicated in FIG. 19. That is, the clutch CL and the brake BK are both brought into the released states. When the drive system 5 is re-started by restoring it back to the "Ready-ON" state, the clutch CL may be required to be placed in the engaged state. Namely, the drive apparatus 100 is switched to any one of the drive modes indicated in FIG. 18, according to the predetermined drive mode switching map, and on the basis of the vehicle running speed V, the accelerator pedal operation amount $A_{CC}$, the operating force $P_S$ acting on the foot brake pedal, etc., when the drive system 5 is re-started, that is, switched from the "Ready-OFF" state back to the "Ready-ON" state. For example, the clutch CL is brought into the engaged state when the drive apparatus 100 is switched to the drive mode EV-2 or HV-2 after the drive system 5 is once placed in the "Ready-OFF" state. However, if the clutch CL is brought into the engaged state while the speed difference ΔN between the carrier C1 of the first planetary gear set 14 and the carrier C2 of the second planetary gear set 16 is comparatively large as in FIG. 19, there is a risk of deceleration of the hybrid vehicle felt by its operator due to resistance caused by an engaging action of the clutch CL.

When the drive system 5 is re-started after it is once placed in the off state, the system control portion 72 controls the output torque of at least one of the first and second electric motors MG1 and MG2 to reduce the speed difference ΔN (between the two rotary elements connected to each other through the clutch CL, that is, between the carrier C1 of the first planetary gear set 14 and the carrier C2 of the second planetary gear set 16), to a value not larger than the threshold value $N_{bo}$, before the clutch CL is brought into the engaged state. That is, if a negative determination is obtained by the above-described speed difference determining portion 74 when the drive system 5 is switched from the "Ready-OFF" state to the "Ready-ON" state, the system control portion 72 commands at least one of the first and second electric motor drive control portions 68 and 70 to control the operation of at least one of the first and second electric motors MG1 and MG2, such that the speed difference ΔN is reduced to the value not larger than the threshold value $N_{bo}$, by the output torque of at least one of the first and second electric motors MG1 and MG2. If an affirmative determination is obtained by the speed difference determining portion 74, the system control portion 72 commands the clutch engagement control portion 62 to bring the clutch CL into the engaged state.

Preferably, the system control portion 72 is configured to bring the clutch CL into the engaged state after the speed difference ΔN (between the carrier C1 of the first planetary gear set 14 and the carrier C2 of the second planetary gear set 16) is reduced to the value not larger than the threshold value $N_{bo}$, by controlling the output torque of the first electric motor MG1, when the drive apparatus 100 is switched to any vehicle drive mode involving an operation of the engine 12, upon re-starting of the drive system 5 after it is once placed in the off state. For instance, the system control portion 72 implements the control of the output torque of the first electric motor MG1 when the drive apparatus 100 is switched to the drive mode HV-2 after the drive system 5 is once placed in the "Ready-OFF" state.

FIG. 20 is the collinear chart indicating the relative rotating speeds of the rotary components of the drive apparatus 100 when the drive apparatus 100 is switched to any drive mode involving an operation of the engine 12 upon re-starting of the drive system 5. If the speed difference ΔN is larger than the threshold value $N_{bo}$, the first electric motor MG1 is operated to generate a positive torque to raise the engine speed $N_E$ for thereby reducing the speed difference ΔN, as indicated by a white arrow in FIG. 20. At this time, the second electric motor MG2 may be operated to generate a negative torque for reducing the speed difference ΔN. Thus, the clutch CL is brought into the engaged state after the speed difference ΔN is reduced to the value not larger than the threshold value $N_{bo}$, so that the degree of deceleration of the hybrid vehicle felt by its operator can be effectively reduced.

Preferably, the system control portion 72 is configured to bring the clutch CL into the engaged state after the second coupling element in the form of the brake BK is brought into the engaged state, and the speed difference ΔN (between the carrier C1 of the first planetary gear set 14 and the carrier C2 of the second planetary gear set 16) is reduced to the value not larger than the threshold value $N_{bo}$, by controlling the output torque of the first electric motor MG1, when the drive apparatus 100 is switched to any vehicle drive mode not involving an operation of the engine 12, upon re-starting of the drive system 5 after it is once placed in the off state. For instance, the system control portion 72 implements the control of the output torque of the first electric motor MG1 when the drive apparatus 100 is switched to the drive mode EV-2 after the drive system 5 is once placed in the "Ready-OFF" state. FIG. 21 is the collinear chart indicating the relative rotating speeds of the rotary components of the drive apparatus 100 when the drive apparatus 100 is switched to the drive mode not involving an operation of the engine 12 upon re-starting of the drive system 5. If the speed difference ΔN is larger than the threshold value $N_{bo}$, the brake BK is brought into the engaged state, and the first electric motor MG1 is operated to generate a negative torque to reduce the speed difference ΔN, as indicated by a white arrow in FIG. 21. At this time, the second electric motor MG2 may be operated to generate a torque. Thus, the clutch CL is brought into the engaged state after the speed difference ΔN is reduced to the value not larger than the threshold value $N_{bo}$, so that the degree of deceleration of the hybrid vehicle felt by its operator can be effectively reduced.

The drive apparatus 100 to be controlled by the electronic control device 30 is configured such that the first differential mechanism in the form of the first planetary gear set 14 includes a first rotary element in the form of the sun gear S1 connected to the first electric motor MG1, a second rotary element in the form of the carrier C1 connected to the engine 12, and a third rotary element in the form of the ring gear R1, while the second differential mechanism in the form of the second planetary gear set 16 includes a first rotary element in the form of the ring gear R2 connected to the output rotary member in the form of the output gear 28 and to the ring gear R1 of the first planetary gear set 14, a second rotary element in the form of the carrier C2, and a third rotary element in the form of the sun gear S2 connected to the second electric motor MG2, and the coupling element in the form of the clutch CL is configured to selectively connect the carrier C1 of the first planetary gear set 14 and the carrier C2 of the second planetary gear set 16 to each other, while the second coupling element in the form of the brake BK is configured to selectively connect the carrier C2 of the second planetary gear set 16 to the stationary member in the form of the housing 26. Accordingly, it is possible to effectively reduce the degree of deceleration of the hybrid vehicle felt by its operator upon re-starting of the drive system 5 which has a practical arrangement.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

5: Hybrid drive system
10, 100: Hybrid vehicle drive apparatus
12: Engine
14: First planetary gear set (First differential mechanism)
16: Second planetary gear set (Second differential mechanism)
26: Housing (Stationary member)
28: Output gear (Output rotary member)
30: Electronic control device (Control apparatus)
BK: Brake (Second coupling element)
BK2: Brake (Second coupling element)
C1: Carrier (Second rotary element)
C2: Carrier (Second rotary element)
CL: Clutch (Coupling element)
CL2: Clutch (Coupling element)
MG1: First electric motor
MG2: Second electric motor
R1: Ring gear (First rotary element)
R2: Ring gear (First rotary element)
S1: Sun gear (Third rotary element)
S2: Sun gear (Third rotary element)

What is claimed is:

1. A drive system of a hybrid vehicle comprising:
a hybrid drive apparatus including:
a differential device which comprises a first differential mechanism and a second differential mechanism and which includes four rotary components; and
an internal combustion engine, a first electric motor, a second electric motor and an output rotary member, which are respectively connected to said four rotary components,
wherein one of the four rotary components includes a rotary element of said first differential mechanism and a rotary element of said second differential mechanism which are selectively connected to each other through a coupling element; and
a control apparatus controlling at least one of output torques of said first and second electric motors, to reduce a difference between rotating speeds of said rotary element of said first differential mechanism and said rotary element of said second differential mechanism which are selectively connected to each other through said coupling element, to a value not larger than a predetermined threshold value, before said coupling element is brought into an engaged state when said drive system is re-started after the drive system is once placed in an off state.

2. The drive system according to claim 1, wherein said first differential mechanism includes a first rotary element connected to said first electric motor, a second rotary element connected to said engine, and a third rotary element, while said second differential mechanism includes a first rotary element, a second rotary element connected to said output rotary member, and a third rotary element connected to said third rotary element of said first differential mechanism and said second electric motor,
and wherein said coupling element is a clutch configured to selectively connect said second rotary element of said first differential mechanism and said first rotary element of said second differential mechanism to each other.

3. The drive system according to claim 1, wherein said first differential mechanism includes a first rotary element, a second rotary element connected to said engine, and a third rotary element connected to said first electric motor, while said second differential mechanism includes a first rotary element connected to said output rotary member and said first rotary element of said first differential mechanism, a second rotary element, and a third rotary element connected to said second electric motor,
and wherein said coupling element is a clutch configured to selectively connect said second rotary element of said first differential mechanism and said second rotary element of said second differential mechanism to each other.

4. The drive system according to claim 1, wherein said control apparatus controls at least the output torque of said first electric motor to reduce said difference between the rotating speeds of said rotary elements of said first and second differential mechanisms to the value not larger than the predetermined threshold value, before said coupling element is brought into the engaged state, where the hybrid drive apparatus is switched to any vehicle drive mode in which said engine is operated, when said drive system is re-started after the drive system is once placed in the off state.

5. The drive system according to claim 1, wherein one of the rotary elements of said first and second differential mechanisms which are selectively connected to each other through said coupling element provided as a first coupling element is selectively connected to a stationary member through a second coupling element,
and wherein said control apparatus brings said second coupling element into an engaged state, and controls at least the output torque of said second electric motor to reduce said difference between the rotating speeds of said rotary elements of said first and second differential mechanisms to the value not larger than the predetermined threshold value, before said first coupling element is brought into the engaged state, where the hybrid drive apparatus is switched to any vehicle drive mode in which said engine is not operated, when said drive system is re-started after the drive system is once placed in the off state.

* * * * *